US011206388B2

(12) United States Patent
Kondo et al.

(10) Patent No.: US 11,206,388 B2
(45) Date of Patent: Dec. 21, 2021

(54) IMAGE PROCESSING APPARATUS AND IMAGE PROCESSING METHOD FOR ALIGNING POLARIZED IMAGES BASED ON A DEPTH MAP AND ACQUIRING A POLARIZATION CHARACTERISTIC USING THE ALIGNED POLARIZED IMAGES

(71) Applicant: SONY CORPORATION, Tokyo (JP)

(72) Inventors: Yuhi Kondo, Tokyo (JP); Yasutaka Hirasawa, Tokyo (JP); Kengo Hayasaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 32 days.

(21) Appl. No.: 15/515,260

(22) PCT Filed: Oct. 28, 2015

(86) PCT No.: PCT/JP2015/080380
§ 371 (c)(1),
(2) Date: Mar. 29, 2017

(87) PCT Pub. No.: WO2016/088483
PCT Pub. Date: Jun. 9, 2016

(65) Prior Publication Data
US 2017/0223339 A1    Aug. 3, 2017

(30) Foreign Application Priority Data

Dec. 1, 2014    (JP) .............................. JP2014-243299

(51) Int. Cl.
*H04N 13/271*    (2018.01)
*H04N 13/214*    (2018.01)
(Continued)

(52) U.S. Cl.
CPC .......... *H04N 13/214* (2018.05); *G01B 11/00* (2013.01); *G01B 11/24* (2013.01); *G01C 3/085* (2013.01);
(Continued)

(58) Field of Classification Search
CPC .. H04N 13/214; H04N 13/229; H04N 13/271; H04N 13/218; H04N 5/2254;
(Continued)

(56) References Cited

U.S. PATENT DOCUMENTS 5,028,138 A * 7/1991 Wolff ..................... G01B 11/24
356/364
2010/0289878 A1* 11/2010 Sato ..................... H04N 13/239
348/46
(Continued)

FOREIGN PATENT DOCUMENTS

CN      102047651 A    5/2011
EP      2741504 A1     6/2014
(Continued)

OTHER PUBLICATIONS

Atkinson, et al., Recovery of Surface Orientation From Diffuse Polarization, IEEE Transactions on Image Processing, Jun. 2006, pp. 1653-1664, vol. 15, No. 6.
(Continued)

*Primary Examiner* — Ayman A Abaza
(74) *Attorney, Agent, or Firm* — Paratus Law Group, PLLC

(57) ABSTRACT

A depth map generation unit generates a depth map from images obtained by picking up a subject at a plurality of viewpoint positions by an image pickup unit. On the basis of the depth map generated by the depth map generation unit, an alignment unit aligns polarized images obtained by the image pickup unit picking up the subject at the plurality of
(Continued)

viewpoint positions through polarizing filters in different polarization direction at the different viewpoint positions. A polarization characteristic acquisition unit acquires a polarization characteristic of the subject from a desired viewpoint position by using the polarized images aligned by the alignment unit to obtain the high-precision polarization characteristic with little degradation in temporal resolution and spatial resolution. It becomes possible to acquire the polarization characteristic of the subject at the desired viewpoint position.

12 Claims, 30 Drawing Sheets

(51) Int. Cl.
| | |
|---|---|
| *G01B 11/24* | (2006.01) |
| *G01B 11/00* | (2006.01) |
| *H04N 5/225* | (2006.01) |
| *H04N 13/218* | (2018.01) |
| *G06T 7/55* | (2017.01) |
| *H04N 5/247* | (2006.01) |
| *H04N 13/229* | (2018.01) |
| *G01C 3/08* | (2006.01) |
| *G01J 4/04* | (2006.01) |
| *H04N 13/00* | (2018.01) |
| *H04N 13/243* | (2018.01) |
| *H04N 13/232* | (2018.01) |

(52) U.S. Cl.
CPC ................. *G01J 4/04* (2013.01); *G06T 7/55* (2017.01); *H04N 5/2258* (2013.01); *H04N 5/247* (2013.01); *H04N 13/218* (2018.05); *H04N 13/229* (2018.05); *H04N 13/271* (2018.05); *H04N 13/232* (2018.05); *H04N 13/243* (2018.05); *H04N 2013/0081* (2013.01)

(58) Field of Classification Search
CPC .... H04N 5/2258; H04N 5/247; H04N 13/232; H04N 13/243; H04N 2013/0081; G06T 7/55; G01B 11/00; G01B 11/24; G01C 3/085; G01J 4/04

USPC ......................................................... 348/49
See application file for complete search history.

(56) References Cited

U.S. PATENT DOCUMENTS

| | | | |
|---|---|---|---|
| 2011/0199458 A1* | 8/2011 | Hayasaka | H04N 13/232 348/43 |
| 2012/0075432 A1 | 3/2012 | Bilbrey et al. | |
| 2016/0080727 A1* | 3/2016 | Komatsu | H04N 13/271 348/49 |

FOREIGN PATENT DOCUMENTS

| | | | |
|---|---|---|---|
| JP | 2010-256138 | | 11/2010 |
| JP | 2010256138 A | * | 11/2010 |
| JP | 2011-171858 | | 9/2011 |
| JP | 2013-030889 | | 2/2013 |
| JP | 2013030889 A | * | 2/2013 |
| JP | 2013-044597 | | 3/2013 |
| JP | 2013044597 A | * | 3/2013 |
| WO | WO2008/099589 A1 | | 8/2008 |
| WO | WO2009/147814 A1 | | 12/2009 |
| WO | WO 2011/049149 A1 | | 4/2011 |

OTHER PUBLICATIONS

Wolff, et al., Constraining Object Features Using a Polarization Reflectance Model, IEEE Transactions on Pattern Analysis and Machine Intelligence, Jul. 1991, pp. 635-657, vol. 13, No. 7.

Jun. 1, 2018, European Search Report issued for related EP Application No. 15865560.5.

Jan. 3, 2019, Chinese Office Action issued for related CN Application No. 201580064243.4.

Aug. 6, 2019, Japanese Office Action issued for related JP Application No. 2016-562351.

Apr. 21, 2020, European Communication issued for related EP application No. 15865560.5.

* cited by examiner

FIG. 14
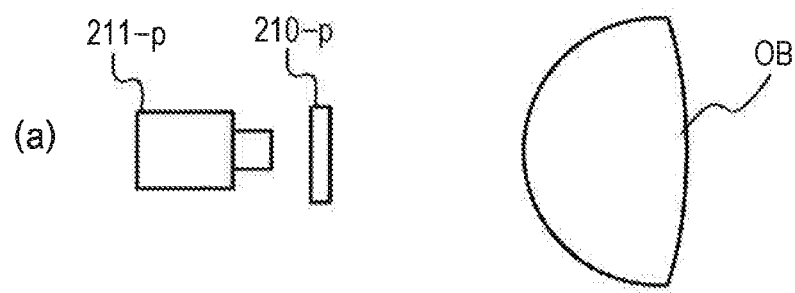
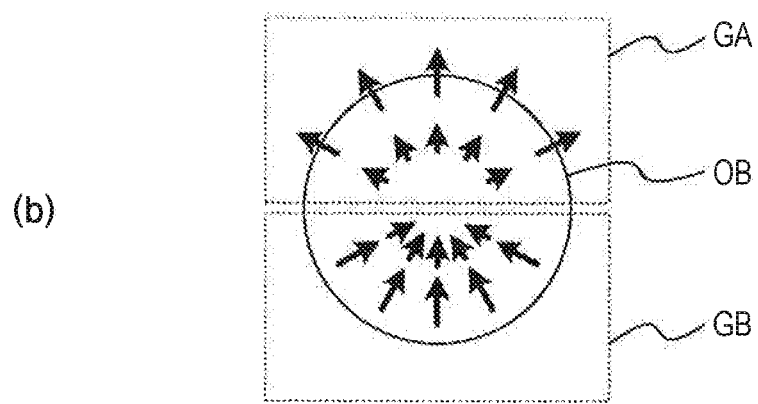
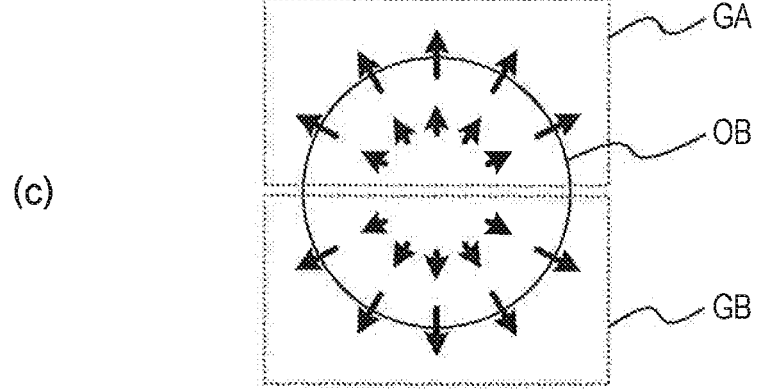

FIG. 17
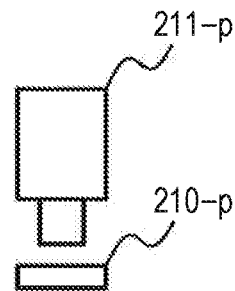
(a)
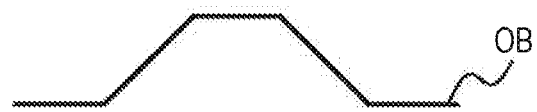
(b) 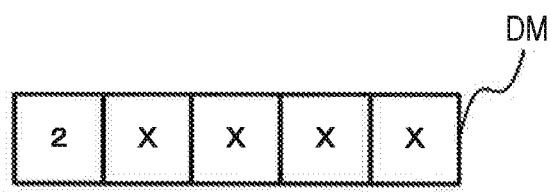
(c) 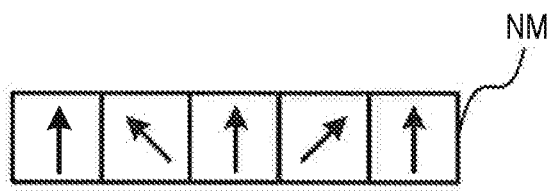
(d)

FIG. 25
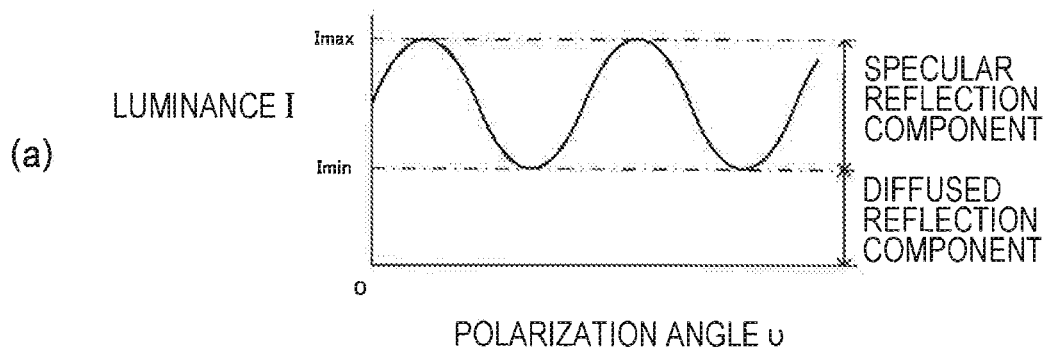
(a)
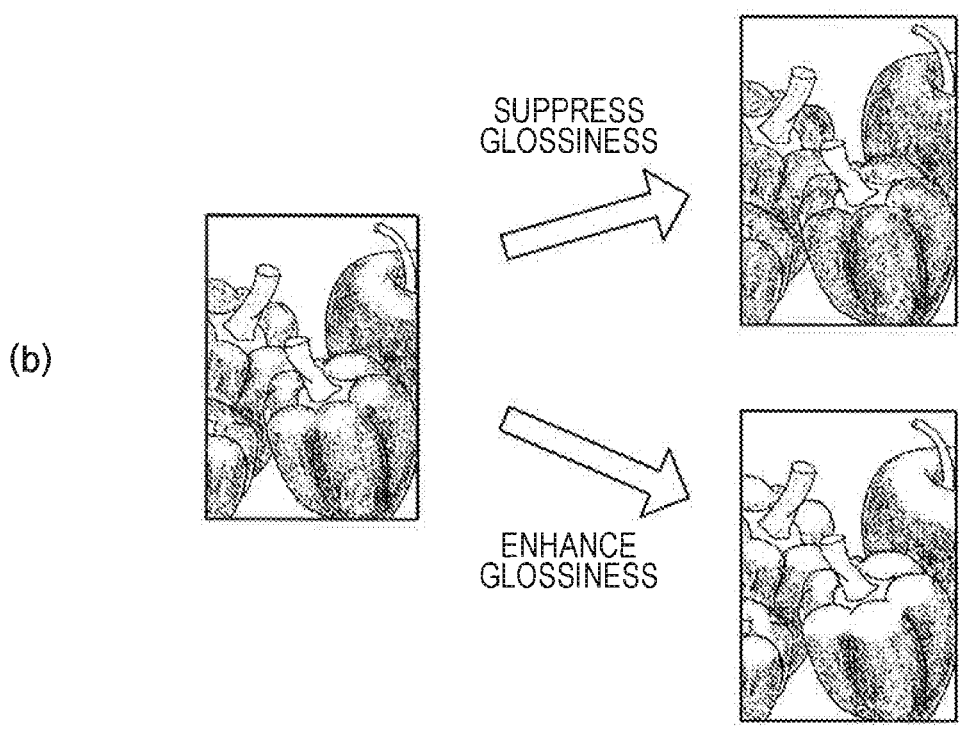
(b)

FIG. 26
(a) 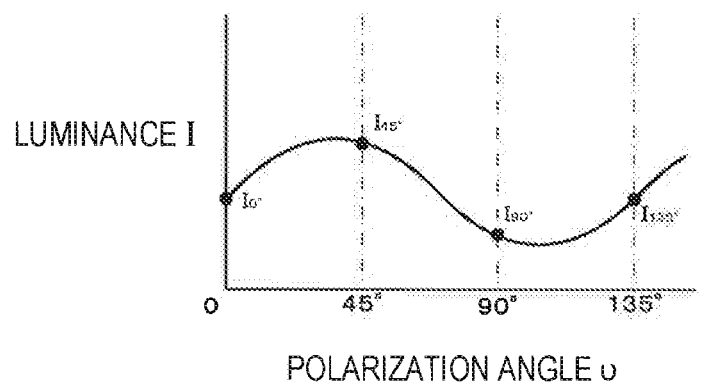
(b) 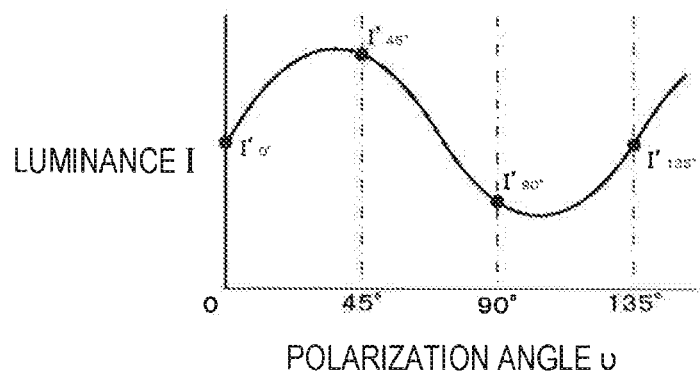
(c) 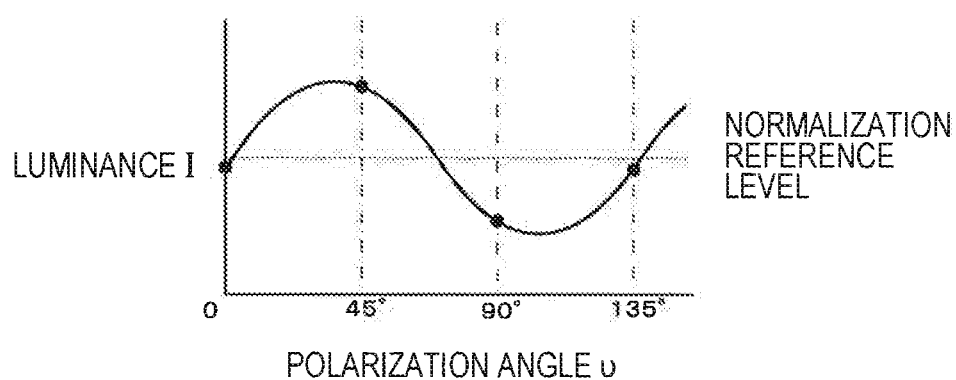

IMAGE PROCESSING APPARATUS AND IMAGE PROCESSING METHOD FOR ALIGNING POLARIZED IMAGES BASED ON A DEPTH MAP AND ACQUIRING A POLARIZATION CHARACTERISTIC USING THE ALIGNED POLARIZED IMAGES

CROSS REFERENCE TO PRIOR APPLICATION

This application is a National Stage Patent Application of PCT International Patent Application No. PCT/JP2015/080380 (filed on Oct. 28, 2015) under 35 U.S.C. § 371, which claims priority to Japanese Patent Application No. 2014-243299 (filed on Dec. 1, 2014), which are all hereby incorporated by reference in their entirety.

TECHNICAL FIELD

This technology relates to an image processing apparatus and an image processing method, and enables acquisition of a polarization characteristic of a subject with high precision.

BACKGROUND ART

Conventionally, methods for acquiring polarized images by using image pickup sections and polarizing filters have been disclosed. For example, Patent Document 1 discloses a method for disposing a polarizing filter in front of an image pickup section and shooting by turning the polarizing filter to acquire polarized images in a plurality of polarization directions. In addition, there is disclosed a method for acquiring polarized images in a plurality of different polarization directions in one image pickup by providing polarizing filters in different polarization directions at respective pixels.

In addition, normal information on a subject is acquired from polarized images in a plurality of polarization directions. For example, Non-Patent Document 1 and Non-Patent Document 2 describe calculation of the normal information by applying polarized images in a plurality of polarization directions to a model equation.

CITATION LIST

Patent Document

Patent Document 1: International Publication WO 2008/099589

Non-Patent Document

Non-Patent Document 1: Lawrence B. Wolff and Terrance E. Boult: "Constraining Object Features Using a Polarization Reflectance Model", IEEE Transaction on pattern analysis and machine intelligence, Vol. 13, No. 7, July 1991

Non-Patent Document 2: Gary A. Atkinson and Edwin R. Hancock: "Recovery of surface orientation from diffuse polarization", IEEE Transactions of Image Processing, Vol. 15, Issue. 6, pp. 1653-1664, 2006

SUMMARY OF THE INVENTION

Problems to be Solved by the Invention

Meanwhile, in order to acquire information such as high-precision normal information on a subject, it is necessary to acquire, with high precision, a polarization characteristic of the subject from polarized images. However, when a polarizing filter is disposed in front of an image pickup device and shooting is performed while polarization directions of this polarizing filter are switched sequentially to acquire images of the plurality of polarization directions, the polarized images will become time-series images, causing degradation in temporal resolution of the polarized images. Therefore, for example, it is difficult to acquire the polarization characteristic of a moving subject. In addition, when polarizing filters in different directions are provided at respective pixels of an imaging element to acquire polarized images in a plurality of polarization directions in one shooting, the polarizing filters in different directions provided at respective pixels of the imaging element will cause degradation in spatial resolution of the polarized images. Therefore, it is difficult to acquire, with high resolution, the polarization characteristic of the subject.

Therefore, an object of this technology is to provide an image processing apparatus and an image processing method capable of acquiring the polarization characteristic of the subject with high precision.

Solutions to Problems

A first aspect of the present technology lies in an image processing apparatus including: an alignment unit configured to align polarized images obtained by picking up a subject at a plurality of viewpoint positions through polarizing filters in different polarization directions at the different viewpoint positions on the basis of a depth map indicating distance information on the subject; and a polarization characteristic acquisition unit configured to acquire a polarization characteristic of the subject from a desired viewpoint position by using the polarized images aligned by the alignment unit.

In this technology, the alignment unit aligns the polarized images obtained by picking up the subject at the plurality of viewpoint positions through the polarizing filters in different polarization directions at different viewpoint positions on the basis of the depth map indicating the distance information on the subject. The depth map is generated by a depth map generation unit on the basis of images obtained by picking up the subject from different viewpoint positions. For example, the depth map generation unit generates the depth map on the basis of parallax between images from the polarized images obtained by picking up the subject at the plurality of viewpoint positions through the polarizing filters in different polarization directions at different viewpoint positions, or from the images picked up without through the polarizing filters or through polarizing filters in an identical polarization direction. In addition, the depth map generation unit generates the depth map for each image combination in the images at the plurality of viewpoint positions and integrates the depth map. For example, the alignment unit determines parallax on the basis of the integrated depth map and a positional relationship between the image pickup sections that generate the polarized images, and aligns the polarized images so as to eliminate the parallax. The polarization characteristic acquisition unit acquires the polarization characteristic of the subject from the desired viewpoint position by using the aligned polarized images. For example, the polarization characteristic acquisition unit acquires the polarization characteristic of the subject from the desired viewpoint position on the basis of luminance and polarization directions of the plurality of aligned polarized images, and a positional relationship between the viewpoint positions of the polarized images and the desired viewpoint position, and the like.

In addition, when a normal map generation unit is provided, the normal map generation unit generates a normal map of the subject at the desired viewpoint position on the basis of the polarization characteristic calculated by the polarization characteristic acquisition unit, or in generation of the normal map, the normal map generation unit eliminates uncertainty of 180 degrees in polarization analysis on the basis of the depth map used by the alignment unit. When a high-precision depth map generation unit is provided, the high-precision depth map generation unit integrates the depth map used by the alignment unit and the normal map generated by the normal map generation unit to generate the depth map that is higher in spatial resolution than the depth map used by the alignment unit. When a polarization characteristic use unit is provided, the polarization characteristic use unit uses the polarization characteristic calculated by the polarization characteristic acquisition unit to perform image processing such as, for example, adjustment of a reflection component of the image at the desired viewpoint position and matching processing using an image characteristic amount calculated from the polarization characteristic.

Furthermore, when an image pickup unit that generates the polarized images is provided, in the image pickup unit, image pickup sections provided at the plurality of viewpoint positions are provided with the polarizing filters in different polarization directions to generate the polarized images at the plurality of viewpoint positions. Alternatively, in the image pickup unit, a plurality of lenses are arranged in a direction orthogonal to an optical axis direction on a light incident surface side of an imaging element, and the lenses are provided with polarizing filters in different polarization directions to generate the polarized images at the plurality of viewpoint positions.

A second aspect of the present technology lies in an image processing method including the steps of: aligning, by an alignment unit, polarized images obtained by picking up a subject at a plurality of viewpoint positions through polarizing filters in different polarization directions at the different viewpoint positions on the basis of a depth map indicating distance information on the subject; and acquiring, by a polarization characteristic acquisition unit, a polarization characteristic of the subject from a desired viewpoint position by using the aligned polarized images.

Effects of the Invention

According to this technology, on the basis of the depth map indicating distance information on the subject, alignment is performed on the polarized images obtained by picking up the subject at the plurality of viewpoint positions through the polarizing filters in different polarization directions at different viewpoint positions. Furthermore, the polarization characteristic of the subject from the desired viewpoint position is acquired by using the aligned polarized images. Therefore, the high-precision polarization characteristic with little degradation in temporal resolution and spatial resolution can be obtained. It is to be noted that effects described in the present specification are merely illustrative and not restrictive, and there may be additional effects.

BRIEF DESCRIPTION OF DRAWINGS

FIGS. 14(a) to 14(c) are each a diagram for describing elimination of uncertainty of 180 degrees.

FIGS. 17(a) to 17(d) are each a diagram for describing high-precision depth map generation processing.

FIGS. 25(a) to 25(b) are each a diagram illustrating a third example of image processing using the polarization characteristic.

FIGS. 26(a) to 26(c) are each a diagram for describing calculation of an image characteristic amount.

MODE FOR CARRYING OUT THE INVENTION

Figure 1:
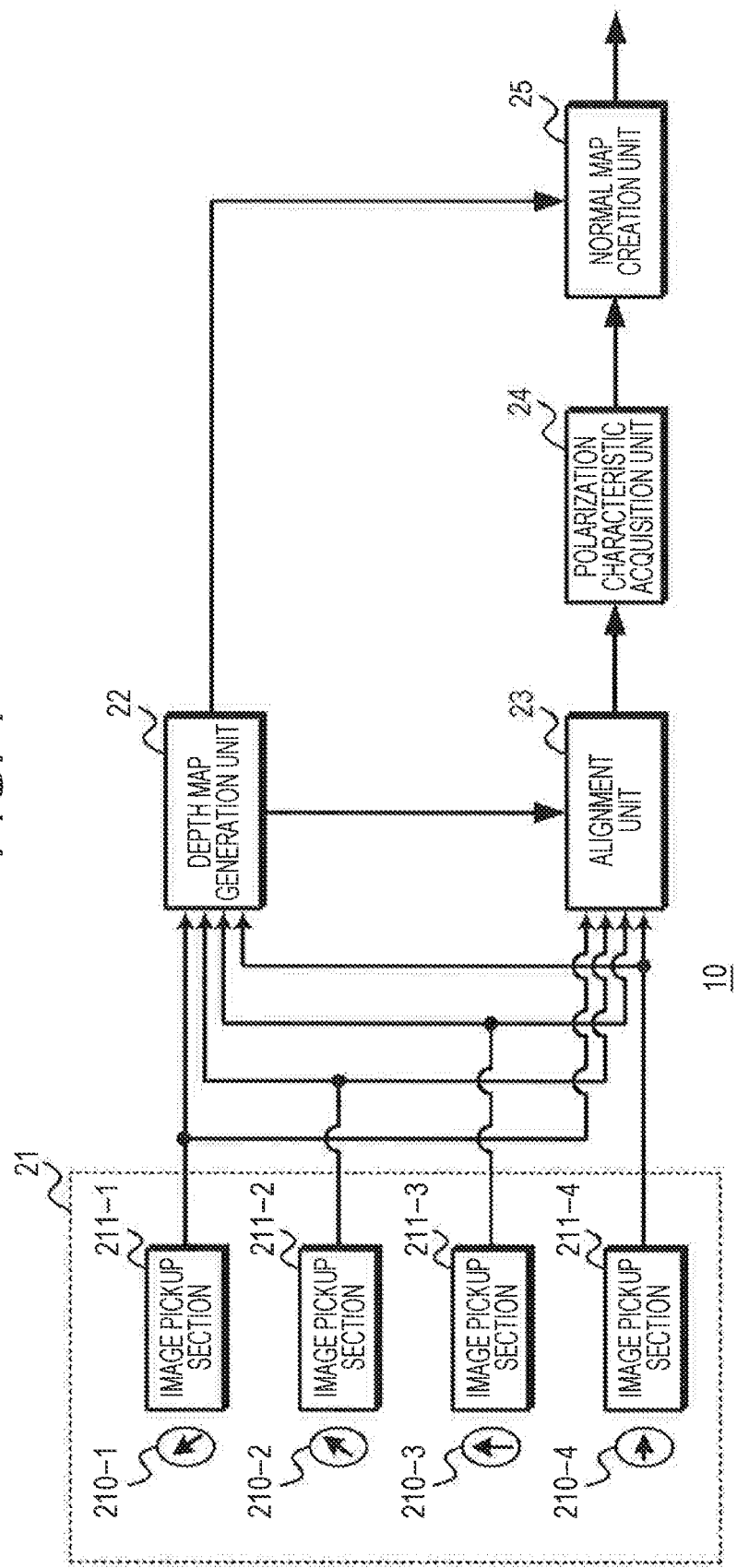
FIG. 1 is a diagram illustrating a functional configuration of a first embodiment.

A mode for carrying out the present technology will be described below. Note that the description will be provided in the following order.

1. First Embodiment
1-1. Configuration of first embodiment
1-2. Operation of first embodiment
2. Second Embodiment
2-1. Configuration of second embodiment
2-2. Operation of second embodiment
3. Third Embodiment
3-1. Configuration of third embodiment
3-2. Operation of third embodiment
4. Fourth Embodiment
4-1. Configuration of fourth embodiment
4-2. Operation of fourth embodiment
5. Another embodiment
6. Applications

1. FIRST EMBODIMENT

[1-1. Configuration of First Embodiment]

FIG. 1 is a diagram illustrating a functional configuration of a first embodiment of the present technology. An image processing apparatus 10 includes an image pickup unit 21, a depth map generation unit 22, an alignment unit 23, a polarization characteristic acquisition unit 24, and a normal map generation unit 25.

The image pickup unit 21 picks up a subject at a plurality of viewpoint positions through polarizing filters in different polarization directions at different viewpoint positions (for example, polarizing plates) to generate polarized images. The image pickup unit 21 includes a plurality of image pickup sections, for example, four image pickup sections 211-1 to 211-4 so as to acquire polarized images in three or more different polarization directions. A polarizing plate 210-1 is provided in front of the image pickup section 211-1. Similarly, polarizing plates 210-2 to 210-4 are provided in front of the image pickup sections 211-2 to 211-4, respectively. The polarizing plates 210-1 to 210-4 are provided in polarization directions different from one another. The image pickup sections 211-1 to 211-4 generate polarized images in polarization directions different from one another. The image pickup unit 21 outputs image data of the polarized images generated by the image pickup sections 211-1 to 211-4 to the depth map generation unit 22 and the alignment unit 23.

FIGS. 2(a) to 2(e) are each a diagram illustrating arrangement of the image pickup sections in the image pickup unit 21. The image pickup unit 21 may have a configuration in which the image pickup sections 211-1 to 211-4 are arranged at four corners of a rectangle as illustrated in (a) of FIG. 2, and may have a configuration in which the image pickup sections 211-1 to 211-4 are arranged in a straight line as illustrated in (b) of FIG. 2. In addition, when the image pickup unit 21 includes the three image pickup sections 211-1 to 211-3, the image pickup unit 21 may have a configuration in which the image pickup sections 211-1 to 211-3 are arranged at vertexes of a triangle as illustrated in (c) of FIG. 2, and may have a configuration in which the image pickup sections 211-1 to 211-3 are arranged in a straight line as illustrated in (d) of FIG. 2. Note that when the image pickup sections are provided at distant positions and parallax is large, positions in the subject at which the polarization characteristic is acquired cannot be picked up by three or more image pickup sections in some cases. Accordingly, the image pickup sections are arranged so as to allow the positions in the subject at which the polarization characteristic is acquired to be picked up by three or more image pickup sections.

Figure 2:
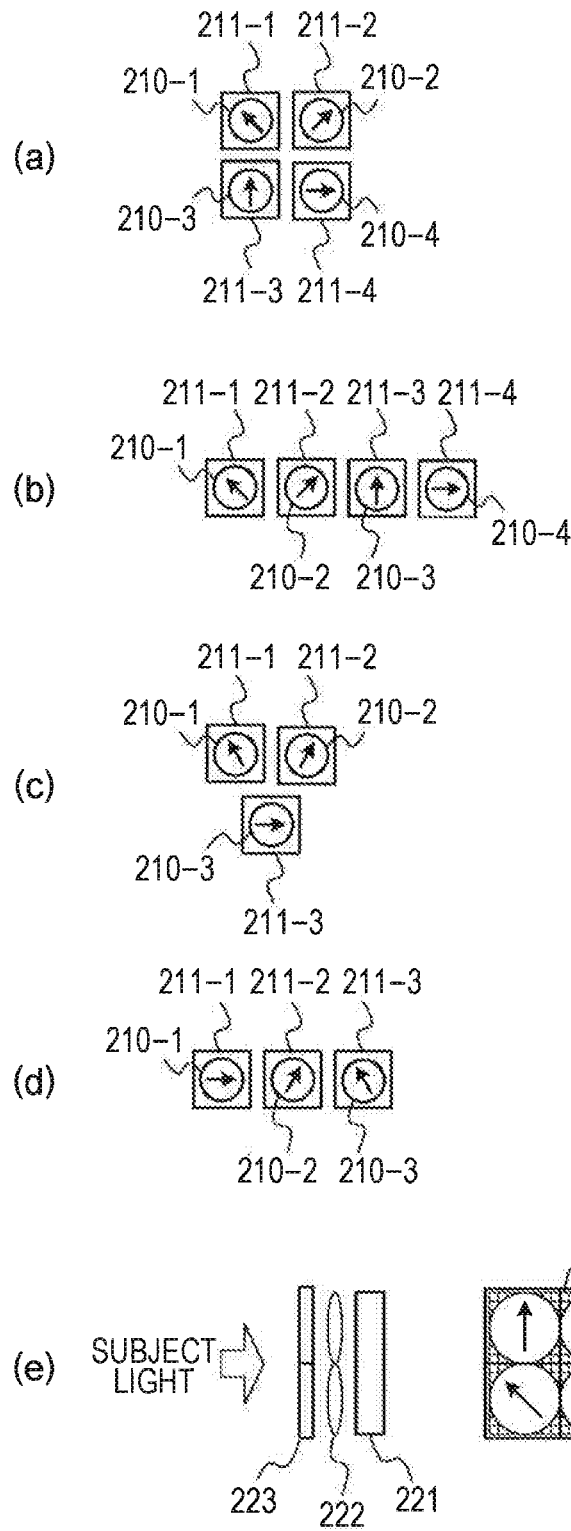
FIGS. 2(a) to 2(e) are each a diagram illustrating arrangement of image pickup sections.

In addition, as illustrated in (e) of FIG. 2, the image pickup unit 21 may have a configuration using a multi-lens array to generate a plurality of polarized images in different polarization directions. For example, a plurality of (four in the diagram) lenses 222 are provided in a direction orthogonal to an optical axis direction in front of an image sensor 221, and optical images of the subject are formed by respective lenses 222 on an imaging surface of the image sensor 221. In addition, polarizing plates 223 are provided in front of respective lenses 222, and the polarizing plates 223 have different polarization directions. Such a configuration allows the image sensor 221 to generate the polarized images in different polarization directions. Note that when respective lenses 222 form the optical images of the subject on the imaging surface of the image sensor 221, spatial resolution of the polarized images is reduced compared with a case where the polarized images are generated by respective image pickup sections. Accordingly, in a case of acquiring the polarization characteristic with high spatial resolution, the polarized images are generated by respective image pickup sections. In addition, since parallax is small compared with a case where the polarized images are generated by respective image pickup sections, in a case of acquiring the polarization characteristic with little influence of parallax, the polarized images are generated with a configuration using the multi-lens array.

When the image pickup unit 21 is configured in this way, it is not necessary to use special image pickup sections as in a case of generating four polarized images in different polarization directions with sub pixels in four polarization directions as one pixel, and thus the image pickup unit 21 can be made easily at low costs.

The image pickup unit 21 uses, for example, linear polarizing plates as the polarizing filters. In addition, the image pickup unit 21 may use not only the linear polarizing plates but also the linear polarizing plates and circular polarizing plates made of quarter wavelength edition. Furthermore, the image pickup unit 21 may be provided with depolarizing plates between the linear polarizing plates and the image pickup sections. For example, when exposure control or the like is performed on the basis of an optical image through a half mirror in the image pickup section, reflectance and transmittance in the half mirror may vary depending on a direction of the linear polarization, which could prevent correct exposure control or the like. Here, when the depolarizing plate is provided, an optical image of linear polarization is converted into an unpolarized optical image and the unpolarized optical image indicating a component after linear polarization enters the image pickup section, which enables correct exposure control or the like on the basis of the optical image through the half mirror.

Figure 3:
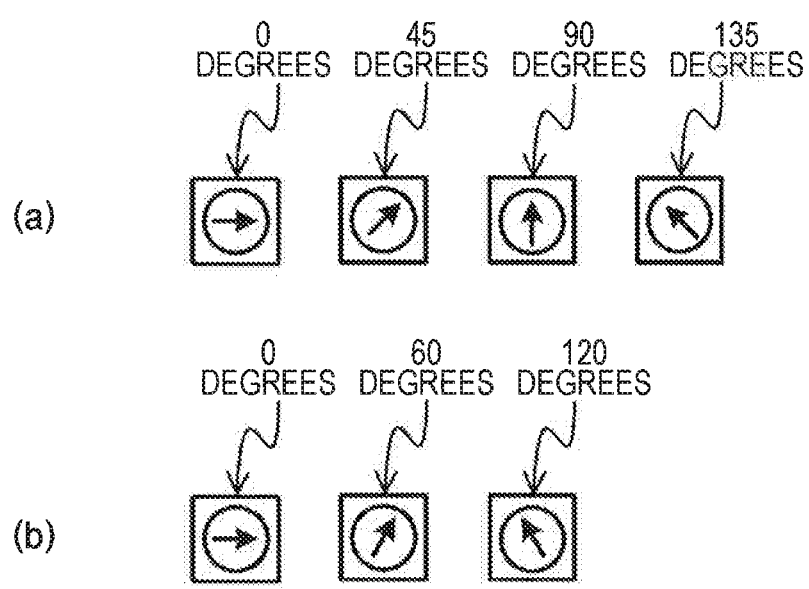
FIGS. 3(a) to 3(b) are each a diagram illustrating polarization directions in an image pickup unit.

In addition, in the image pickup unit 21, the polarization directions are set so as to allow a plurality of polarized images in different polarization directions to be generated. When the polarization direction of the linear polarizing plate is rotated by 180 degrees, components passing the linear polarizing plate become equal to each other. Accordingly, the polarization directions are set to differ from one another in a range from 0 degrees to 180 degrees. Here, as will be described later, the image processing apparatus 10 calculates a polarization model equation on the basis of luminance and the polarization directions of the polarized images generated by the plurality of image pickup sections. Therefore, it is preferable to set the polarization directions, for example, to have identical angular differences so as to allow calculation of the polarization model equation with high precision. FIGS. 3(a) to 3(b) each illustrate the polarization directions in the image pickup unit 21. (a) of FIG. 3 illustrates the polarization directions when four image pickup sections are used. In the image pickup unit 21, for example, assuming that the polarization directions are 0 degrees, 45 degrees, 90 degrees, and 135 degrees, four image pickup sections generate four polarized images in the polarization directions having an identical angular difference (45 degrees). In addition, (b) of FIG. 3 illustrates the polarization directions when three image pickup sections are used. In the image pickup unit 21, for example, assuming that the polarization directions are 0 degrees, 60 degrees, and 120 degrees, three image pickup sections generate three polarized images in the polarization directions having an identical angular difference (60 degrees).

The depth map generation unit 22 generates a depth map indicating distance information on the subject from the images at different viewpoint positions generated by the image pickup unit 21. The depth map generation unit 22 performs stereo matching processing on each pair of polarized images in the polarized images at the plurality of different viewpoint positions generated by the image pickup unit 21. In addition, the depth map generation unit 22 generates, for example, the depth map indicating depth at each pixel on the basis of a stereo matching processing result and calibration information acquired in advance about the image pickup sections. The calibration information has positional information indicating a positional relationship between the image pickup sections. In addition, when the calibration information includes parameters or the like regarding optical distortion that occurs in each image pickup section, even if optical distortion occurs in an image generated by the image pickup section, it becomes possible to eliminate this optical distortion and to perform stereo matching processing or the like with high precision. The depth map generation unit 22 integrates the depth map generated for each pair of polarized images to generate a depth map with higher precision than before the integration. The depth map generation unit 22 outputs the integrated depth map to the alignment unit 23 and the normal map generation unit 25.

The alignment unit 23 aligns the polarized images generated by the image pickup unit 21 on the basis of the depth map generated by the depth map generation unit 22. The alignment unit 23 determines parallax on the basis of, for example, the depth of the integrated depth map generated by the depth map generation unit 22 and the positional relationship between the image pickup sections indicated in the previously acquired calibration information, and aligns the polarized images for each pixel so as to cause parallax to be "0", that is, so as to cause the subject to match. The alignment unit 23 outputs the polarized images after the alignment to the polarization characteristic acquisition unit The polarization characteristic acquisition unit 24 acquires the polarization characteristic of the subject from a desired viewpoint position by using the polarized images after the alignment. The polarization characteristic acquisition unit 24 calculates a rotation matrix with the image pickup sections as the desired viewpoint position on the basis of the positional relationship between the image pickup sections indicated in the calibration information and the depth map. In addition, the polarization characteristic acquisition unit 24 calculates the polarization model equation indicating the polarization characteristic of the subject from the desired viewpoint position from information such as the polarization directions and luminance of the plurality of polarized images, and the rotation matrix indicating the positional relationship between the image pickup sections that generate the polarized images and the desired viewpoint position. The polarization characteristic acquisition unit 24 outputs the acquired polarization model equation, which is the polarization characteristic, to the normal map generation unit 25.

The normal map generation unit 25 generates a normal map of the subject on the basis of the polarization characteristic of the subject from the desired viewpoint position acquired by the polarization characteristic acquisition unit 24. The normal map generation unit 25 calculates a zenith angle for each pixel on the basis of an azimuth angle at which luminance becomes highest and a polarization degree from the polarization characteristic acquired by the polarization characteristic acquisition unit 24, that is, the polarization model equation, and generates the normal map that stores normal information indicating a normal direction (azimuth angle and zenith angle). Note that the normal information in the normal map calculated by ellipsometry has no distinction between 0 degrees and 180 degrees, or between 45 degrees and 225 degrees of the polarizing plate, and thus has uncertainty of 180 degrees in principle as will be described later. Therefore, the normal map generation unit 25 eliminates uncertainty of 180 degrees in the normal map by using the depth map that is output from the depth map generation unit 22 to the alignment unit 23 and the normal map generation unit 25.

[1-2. Operation of First Embodiment]

Figure 4:
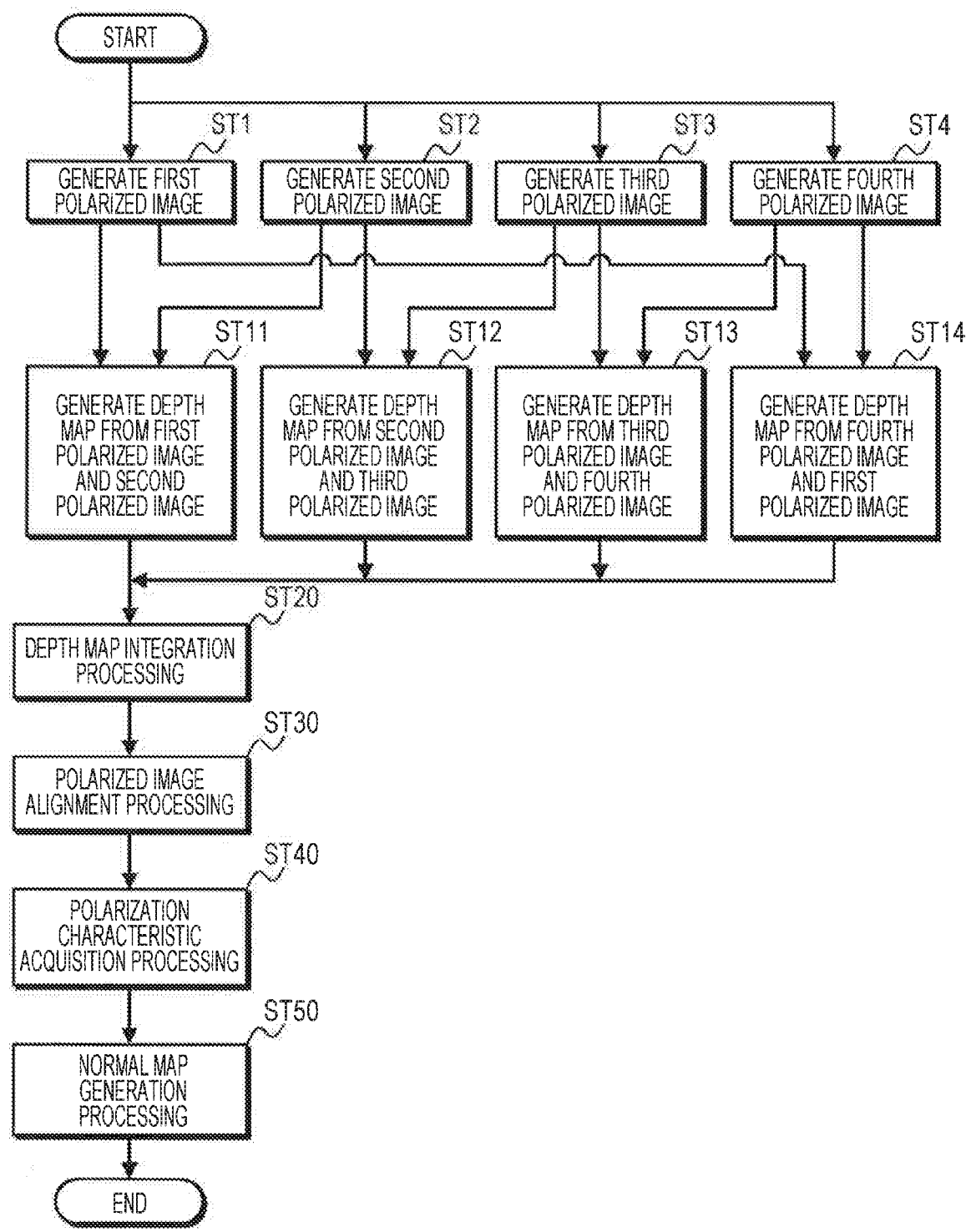
FIG. 4 is a flowchart illustrating an operation of the first embodiment.

Next, an operation of the first embodiment will be described. FIG. 4 is a flowchart illustrating the operation of the first embodiment, and illustrates a case where the image pickup unit 21 includes four image pickup sections 211-1 to 211-4.

In step ST1 to step ST4, the image pickup unit 21 generates the polarized images. For example, in step ST1, the image pickup section 211-1 of the image pickup unit 21 generates a first polarized image. In step ST2, the image pickup section 211-2 generates a second polarized image. In step ST3, the image pickup section 211-3 generates a third polarized image. In step ST4, the image pickup section 211-4 generates a fourth polarized image. Thus, the image pickup sections 211-1 to 211-4 generate the polarized images in different polarization directions at different viewpoint positions, and then the image processing apparatus 10 proceeds to step ST11 to step ST14.

In step ST11 to step ST14, the depth map generation unit 22 generates the depth maps. For example, in step ST11, the depth map generation unit 22 generates the depth map from the first polarized image and the second polarized image.

Figure 5:
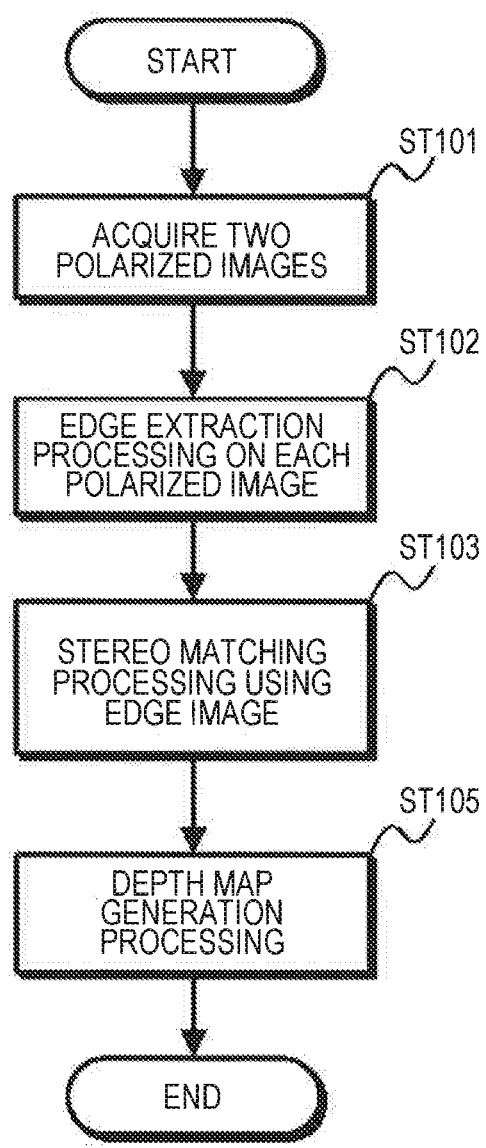
FIG. 5 is a flowchart illustrating an operation of a depth map generation unit.

FIG. 5 is a flowchart illustrating an operation of the depth map generation unit. In step ST101, the depth map generation unit 22 acquires two polarized images. The depth map generation unit 22 acquires the first polarized image generated by the image pickup section 211-1 and the second polarized image generated by the image pickup section 211-2, and then proceeds to step ST102.

In step ST102, the depth map generation unit 22 performs edge extraction processing on each polarized image. When the polarizing filters are provided in front of the image pickup sections and an identical subject is picked up, the images generated by the image pickup sections will be images with different luminance depending on a difference in the polarization directions. Therefore, the depth map generation unit 22 performs edge extraction processing on the polarized images to generate edge images so as to enable stereo matching processing even if luminance variation is caused by the difference in the polarization directions. The depth map generation unit 22 performs edge extraction processing to generate a first edge image from the first polarized image and a second edge image from the second polarized image, and then proceeds to step ST103.

In step ST103, the depth map generation unit 22 performs stereo matching processing using the edge images. The depth map generation unit 22 performs stereo matching processing on the first edge image and the second edge image. In the stereo matching processing, the depth map generation unit 22 detects a pixel of interest in the first edge image and a phase difference of the second edge image corresponding to this pixel of interest (a difference in pixel positions based on parallax). As the stereo matching processing, for example, a template matching method is used for detecting a most similar image region to a template image that is set to include the pixel of interest from the second edge image. In addition, the stereo matching processing is not limited to the template matching method, but other methods may be used (for example, a graph cut method or the like). The depth map generation unit 22 calculates the phase difference by performing the stereo matching processing, and then proceeds to step ST105.

In step ST105, the depth map generation unit 22 performs depth map generation processing. The depth map generation unit 22 calculates depth, which is a distance from the pixel of interest to the subject, on the basis of information such as the phase difference detected by the stereo matching processing and the calibration information acquired in advance. In addition, the depth map generation unit 22 associates the calculated depth with the pixel of the polarized image to generate the depth map.

Figure 6:
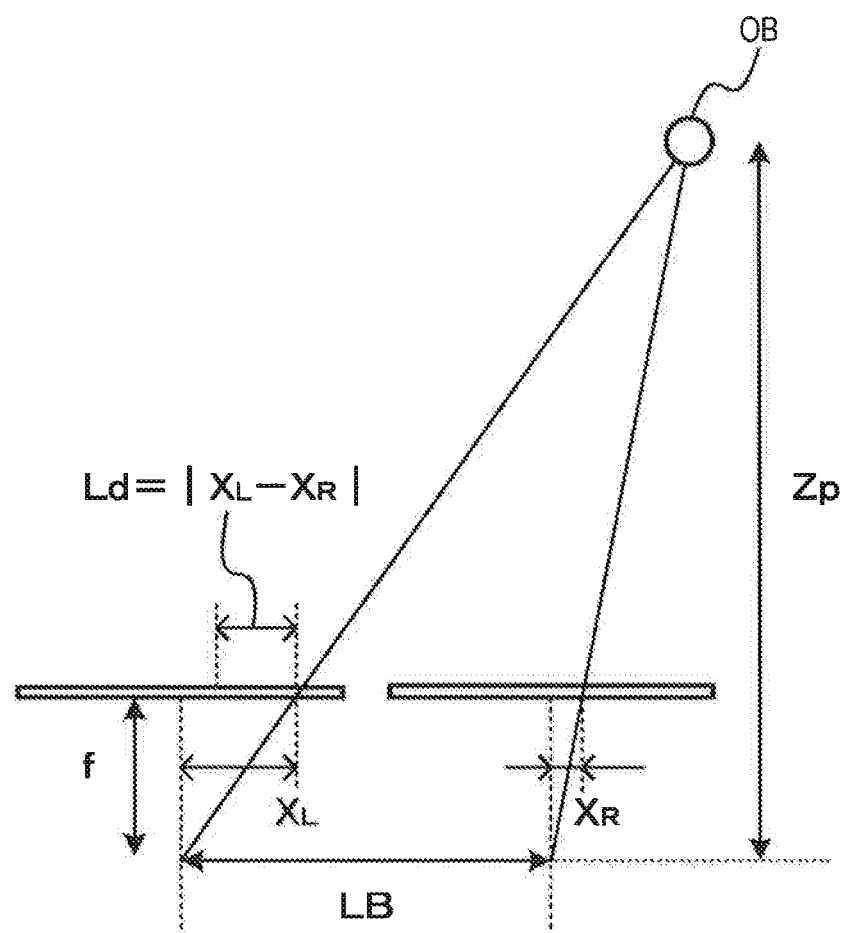
FIG. 6 is a diagram for describing depth calculation processing.

FIG. 6 is a diagram for describing depth calculation processing. Note that FIG. 6 illustrates a case where two image pickup sections are arranged right and left in an identical posture. Here, it is assumed that, for example, the image pickup section 211-1 is a standard image pickup section, and that the image pickup section 211-2 is a reference image pickup section. In addition, it is assumed that spacing between reference positions of the image pickup sections (base length) is "LB", and that a focal length of the image pickup sections is "f." When the stereo matching processing indicates that a position $X_R$ of the subject OB in the reference image pickup section is shifted by a phase difference "Ld" from a position $X_L$ of the subject OB in the standard image pickup section, a distance "Zp" to the subject can be calculated by Equation (1).

[Mathematical Formula 1]

$$Zp = \frac{LB \times f}{Ld} \quad (1)$$

Figure 7:
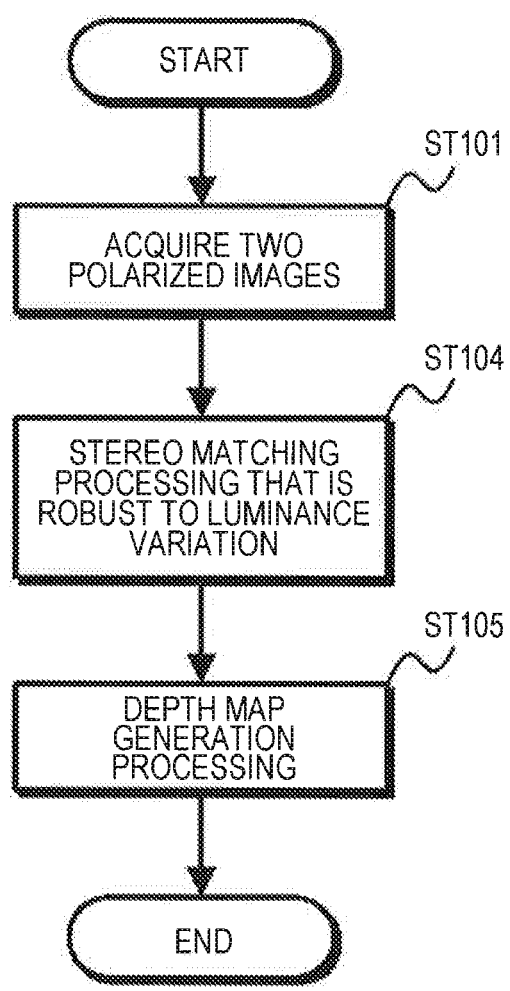
FIG. 7 is a flowchart illustrating another operation of the depth map generation unit.

In addition, the depth map generation unit may generate the depth map by using not only the edge images but also other methods. FIG. 7 is a flowchart illustrating another operation of the depth map generation unit, and illustrates a case where stereo matching processing that is robust to a luminance variation is used. In step ST101, the depth map generation unit 22 captures two polarized images. The depth map generation unit 22 captures the first polarized image generated by the image pickup section 211-1 and the second polarized image generated by the image pickup section 211-2, and then proceeds to step ST104.

In step ST104, the depth map generation unit 22 performs stereo matching processing that is robust to a luminance variation. The depth map generation unit 22 performs stereo matching processing that is robust to a luminance variation by using the first polarized image and the second polarized image, detects the pixel of interest in the first polarized image and an amount of movement of a pixel position of the second polarized image corresponding to this pixel of interest (phase difference between parallax images). In the stereo matching processing that is robust to a luminance variation, for example, zero-mean normalized cross correlation (ZNCC) is used. Equation (2) is a formula of zero-mean normalized cross correlation $R_{ZNCC}$. Subtraction of a mean value of a luminance value from the luminance value for normalization enables matching that is robust to a luminance difference. In Equation (2), "T (i, j)" denotes a luminance value of a pixel at coordinates (i, j) in the standard image (template), whereas "I (i, j)" denotes a luminance value of a pixel at coordinates (i, j) in the reference image. In addition, "M" is the number of pixels indicating a width of the template, whereas "N" is the number of pixels indicating a height of the template. Note that the stereo matching processing that is robust to a luminance variation is not limited to the zero-mean normalized cross correlation, but other methods may be used.

[Mathematical Formula 2]

$$R_{ZNCC} = \frac{MN \sum_{j=0}^{N-1} \sum_{i=0}^{M-1} I(i,j)T(i,j) - \sum_{j=0}^{N-1} \sum_{i=0}^{M-1} I(i,j) \times \sum_{j=0}^{N-1} \sum_{i=0}^{M-1} T(i,j)}{\sqrt{\left(MN \sum_{j=0}^{N-1} \sum_{i=0}^{M-1} I(i,j)^2 - \left(\sum_{j=0}^{N-1} \sum_{i=0}^{M-1} I(i,j)\right)^2\right)\left(MN \sum_{j=0}^{N-1} \sum_{i=0}^{M-1} T(i,j)^2 - \left(\sum_{j=0}^{N-1} \sum_{i=0}^{M-1} T(i,j)\right)^2\right)}} \quad (2)$$

The depth map generation unit 22 performs stereo matching processing that is robust to a luminance variation, calculates the phase difference, and proceeds to step ST105.

In step ST105, the depth map generation unit 22 performs depth map generation processing. The depth map generation unit 22 calculates the depth, which is a distance from the pixel of interest to the subject, on the basis of information such as the phase difference detected by the stereo matching processing and the calibration information acquired in advance. In addition, the depth map generation unit 22 associates the calculated depth with the pixel of the polarized image to generate the depth map.

Returning to FIG. 4, in step ST12, the depth map generation unit 22 generates the depth map from the second polarized image and the third polarized image. In step ST13, the depth map generation unit 22 generates the depth map from the third polarized image and the fourth polarized image. In step ST14, the depth map generation unit 22 generates the depth map from the fourth polarized image and the first polarized image. Note that when the number of polarized images is "J", the depth map generation unit 22 can generate the depth map of the maximum number of image pairs "J(J−1)/2." In addition, the pairs of polarized images are not limited to a combination illustrated in FIG. 4. For example, the depth map generation unit 22 may define any one of the polarized images as a reference and generate a plurality of depth maps for respective image pairs of this polarized image and another polarized image. For example, by defining the first polarized image as a reference, three depth maps may be generated for the first polarized image, by using the first polarized image and the second polarized image, the first polarized image and the third polarized image, and the first polarized image and the fourth polarized image.

In step ST20, the depth map generation unit 22 performs depth map integration processing. The depth map generation unit 22 integrates the depth maps generated for respective pairs of polarized images to generate the depth map with higher precision than before the integration. The depth map generation unit 22 integrates the depth maps, for example, by a method similar to Japanese Patent No. 5387856 "Image processing apparatus, image processing method, image processing program, and image pickup device." That is, the depth map generation unit 22 performs reliability determination processing on the basis of a shape of a correlation characteristic line that indicates a relationship between a correlation value indicating similarity calculated in the stereo matching processing and the pixel position. In the reliability determination, determination is made using kurtosis, which is an index indicating a degree of sharpness in the shape of the correlation characteristic line. In addition, in the reliability determination, determination may be made using a difference value in the correlation value between a vertex and a surrounding point in the correlation characteristic line, or determination may be made using an integrated value (integration value) of a differential value of the correlation value at each pixel position, and the like. Furthermore, the depth map generation unit 22 generates the depth map after the integration on the basis of a reliability determination result in each depth map by performing processing for employing the depth with the highest reliability at a pixel indicating an identical position of the subject for each pixel. Note that when a plurality of depth maps are generated on the basis of any one of the polarized images, in each depth map, an identical pixel position indicates an identical position of the subject. Therefore, by employing the most reliable depth from reliability of each depth map at each pixel position, the depth maps can be easily integrated. The depth map generation unit 22 performs the depth map integration processing, generates the depth map after the integration, and then proceeds to step ST30.

In step ST30, the alignment unit 23 performs polarized image alignment processing. The alignment unit 23 determines parallax with respect to the desired viewpoint position on the basis of the depth map after metaphor integration and the positional information between the image pickup sections indicated in the calibration information, and then aligns the plurality of polarized images so as to cause parallax to be "0", that is, so as to cause the subject to match. Note that the desired viewpoint position is not limited to any one of the image pickup sections 211-1 to 211-4, but may be, for example, a position within a rectangle or the like when the image pickup sections 211-1 to 211-4 are provided at four corners of the rectangle. In addition, when the desired viewpoint position is a viewpoint position of the polarized image that is used as reference at a time of generating the depth map, since the depth map after integration at the desired viewpoint position has been generated, the polarized images can be aligned easily at each pixel. Thus, the alignment unit 23 aligns the polarized images, and then proceeds to step ST40.

Figure 8:
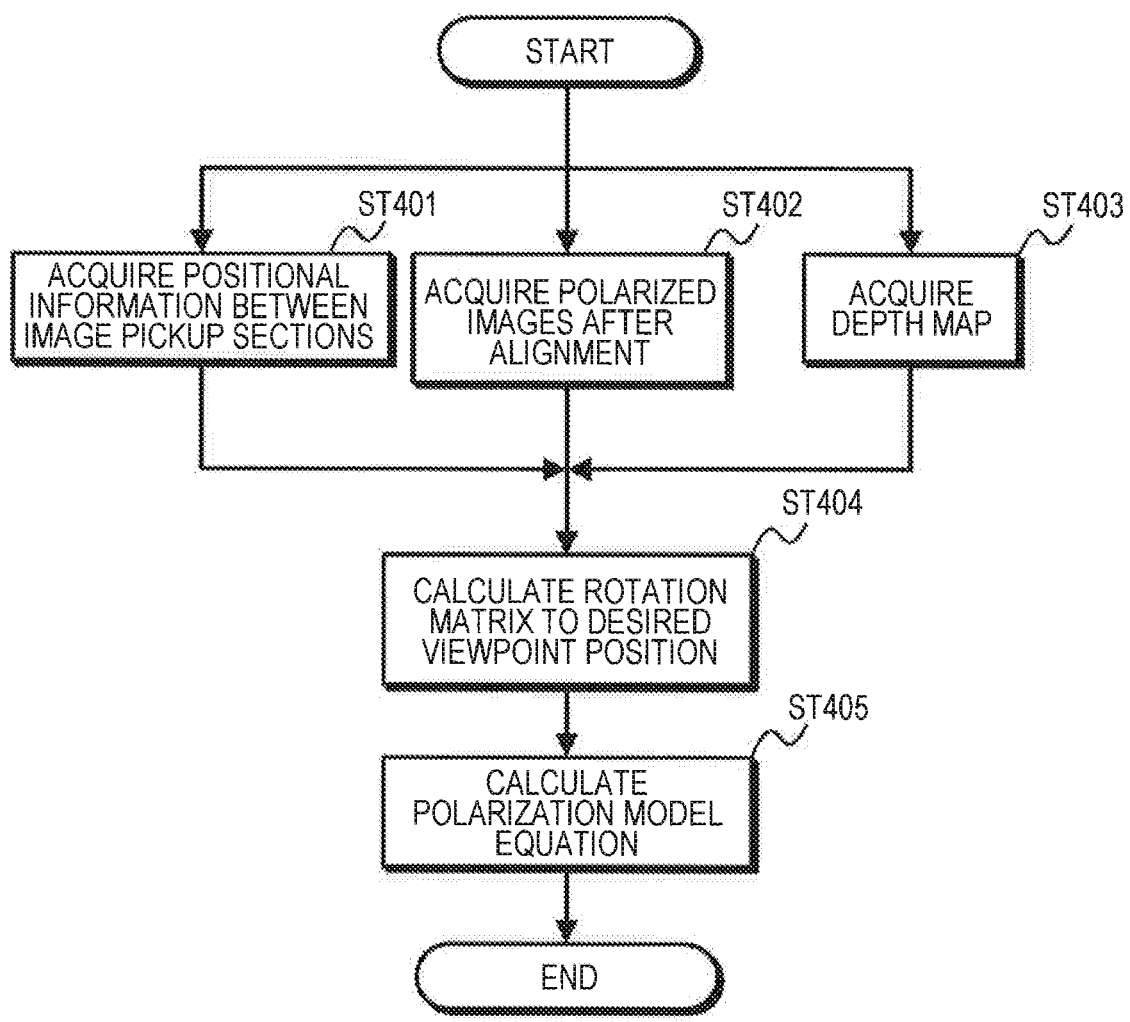
FIG. 8 is a flowchart illustrating polarization characteristic acquisition processing.

In step ST40, the polarization characteristic acquisition unit 24 performs polarization characteristic acquisition processing. The polarization characteristic acquisition unit 24 acquires the polarization characteristic at the desired viewpoint position by using the polarized image after alignment. FIG. 8 is a flowchart illustrating polarization characteristic acquisition processing.

In step ST401, the polarization characteristic acquisition unit 24 acquires the positional information between the image pickup sections. The polarization characteristic acquisition unit 24 acquires the positional information between the image pickup sections included in the calibration information that is set in advance. In step ST402, the polarization characteristic acquisition unit 24 acquires the polarized images after alignment. The polarization characteristic acquisition unit 24 acquires the polarized images after alignment that is output from the alignment unit 23. In step ST403, the polarization characteristic acquisition unit 24 acquires the depth map. The polarization characteristic acquisition unit 24 acquires the depth map generated by the depth map generation unit 22.

In step ST404, the polarization characteristic acquisition unit 24 calculates the rotation matrix to the desired viewpoint position. The polarization characteristic acquisition unit 24 calculates the rotation matrix R with the image pickup section that generates the polarized image as the viewpoint position desired by a user or the like on the basis of the calibration information and the depth map, and then proceeds to step ST405. Note that Equation (3) illustrates the rotation matrix R.

[Mathematical Formula 3]

$$R = \begin{pmatrix} a & b & c \\ d & e & f \\ g & h & i \end{pmatrix} \quad (3)$$

In step ST405, the polarization characteristic acquisition unit 24 calculates the polarization model equation with respect to the desired viewpoint position. Here, it is assumed that, for example, with respect to an image pickup section 211-$n$, the image pickup section 211-$p$ at the desired viewpoint position has the positional relationship illustrated in FIG. 9.

Figure 10:
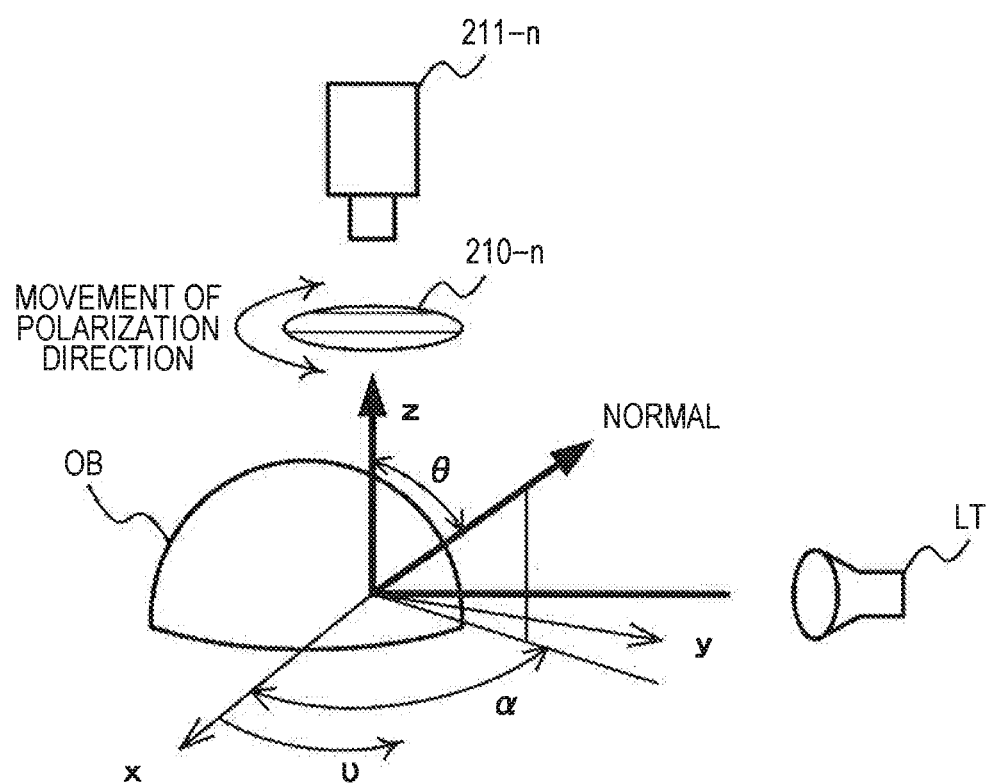
FIG. 10 is a diagram for describing a subject surface shape and a polarized image.
Figure 11:
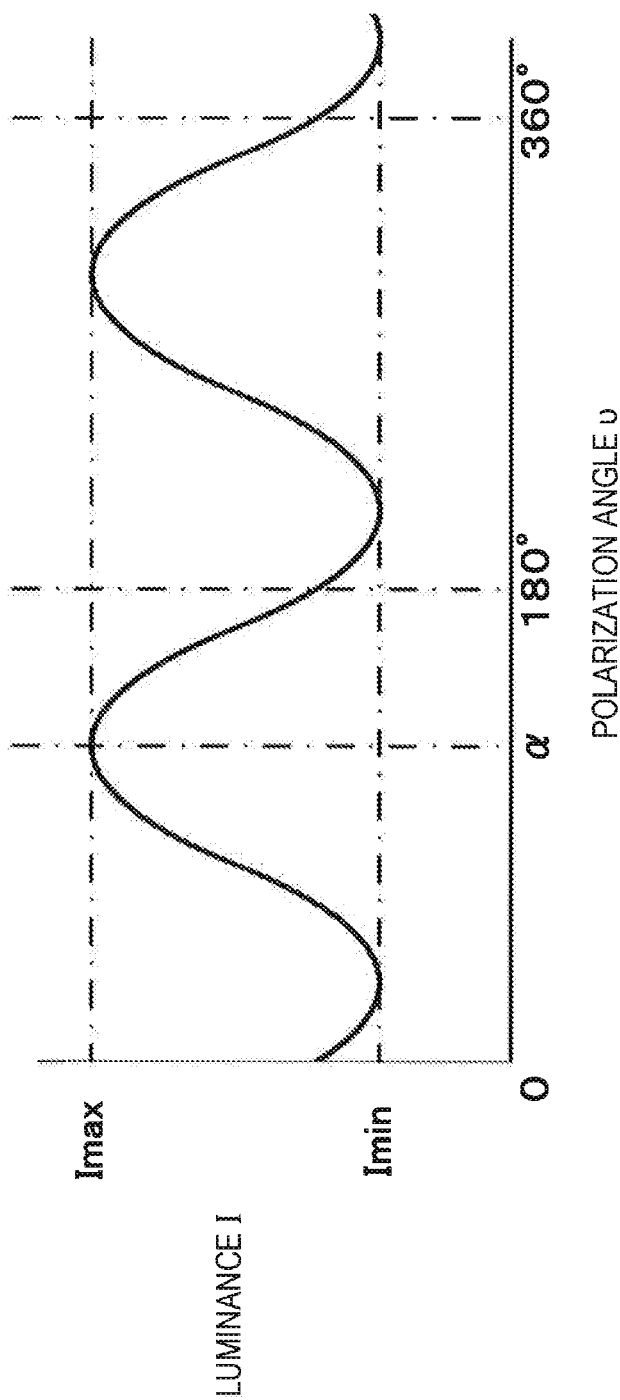
FIG. 11 is a diagram illustrating a relationship between luminance and a polarization angle.

FIG. 10 is a diagram for describing a subject surface shape and the polarized image. As illustrated in FIG. 10, for example, the subject OB is illuminated using a light source LT, and the image pickup section 211-$n$ picks up the subject OB through a polarizing plate 210-$n$. In this case, it is assumed that luminance of the subject OB varies depending on the polarization direction of the polarizing plate 210-$n$ in the picked up image, and that the highest luminance is Imax and the lowest luminance is Imin. In addition, it is assumed that an x-axis and a y-axis in two-dimensional coordinates are on a plane of the polarizing plate 210-$n$, and that the polarization direction of the polarizing plate 210-$n$ is a polarization angle v, which is an angle of a y-axis direction with respect to the x-axis. The polarizing plate 210-$n$ has a cycle of 180 degrees, and when the polarization direction is rotated by 180 degrees, the polarizing plate 210-$n$ returns to an original polarization state. In addition, it is assumed that the polarization angle υ when the highest luminance Imax is observed is an azimuth angle α. When such a definition is made, if the polarization direction of the polarizing plate 210-$n$ is changed, observed luminance I can be expressed by the polarization model equation of Equation (4). Note that FIG. 11 illustrates a relationship between luminance and the polarization angle.

[Mathematical Formula 4]

$$I = \frac{I_{max} + I_{min}}{2} + \frac{I_{max} - I_{min}}{2}\cos 2(\upsilon - \alpha) \quad (4)$$

In Equation (4), the polarization angle $\upsilon$ is apparent at a time of generation of the polarized image, and the highest luminance Imax, the lowest luminance Imin, and the azimuth angle $\alpha$ are variables.

Figure 12:
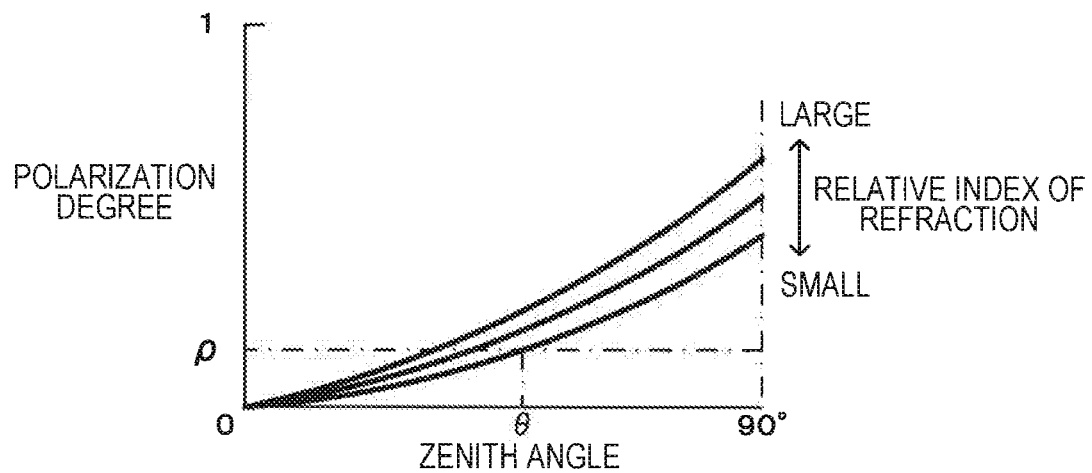
FIG. 12 is a diagram illustrating a relationship between a polarization degree and a zenith angle.

In addition, it is assumed that an object surface normal is expressed by a polar coordinate system, and that normal information is the azimuth angle $\alpha$ and a zenith angle $\theta$. Note that it is assumed that the zenith angle $\theta$ is an angle from a z-axis to the normal, and that the azimuth angle $\alpha$ is an angle of the y-axis direction with respect to the x-axis as described above. Here, if the polarization direction of the polarizing plate 210-n is changed and the lowest luminance Imin and the highest luminance Imax are obtained, a polarization degree $\rho$ can be calculated by Equation (5). In addition, the polarization degree $\rho$ can be calculated using a relative refractive index n of the subject OB and the zenith angle $\theta$, as expressed by Equation (5). A relationship between the polarization degree and the zenith angle is, for example, a characteristic illustrated in FIG. 12, and by using this characteristic, the zenith angle $\theta$ is determined on the basis of the polarization degree $\rho$. Note that as is apparent from Equation (5), the characteristic illustrated in FIG. 12 is dependent on the relative refractive index n, and the polarization degree increases as the relative refractive index n increases.

[Mathematical Formula 5]

$$\rho = \frac{I_{max} - I_{min}}{I_{max} + I_{min}} = \frac{(n - 1/n)\sin^2\theta}{2 + 2n^2 - (n + 1/n)^2\sin^2\theta + 4\cos\theta\sqrt{n^2 - \sin^2\theta}} \quad (5)$$

Figure 9:
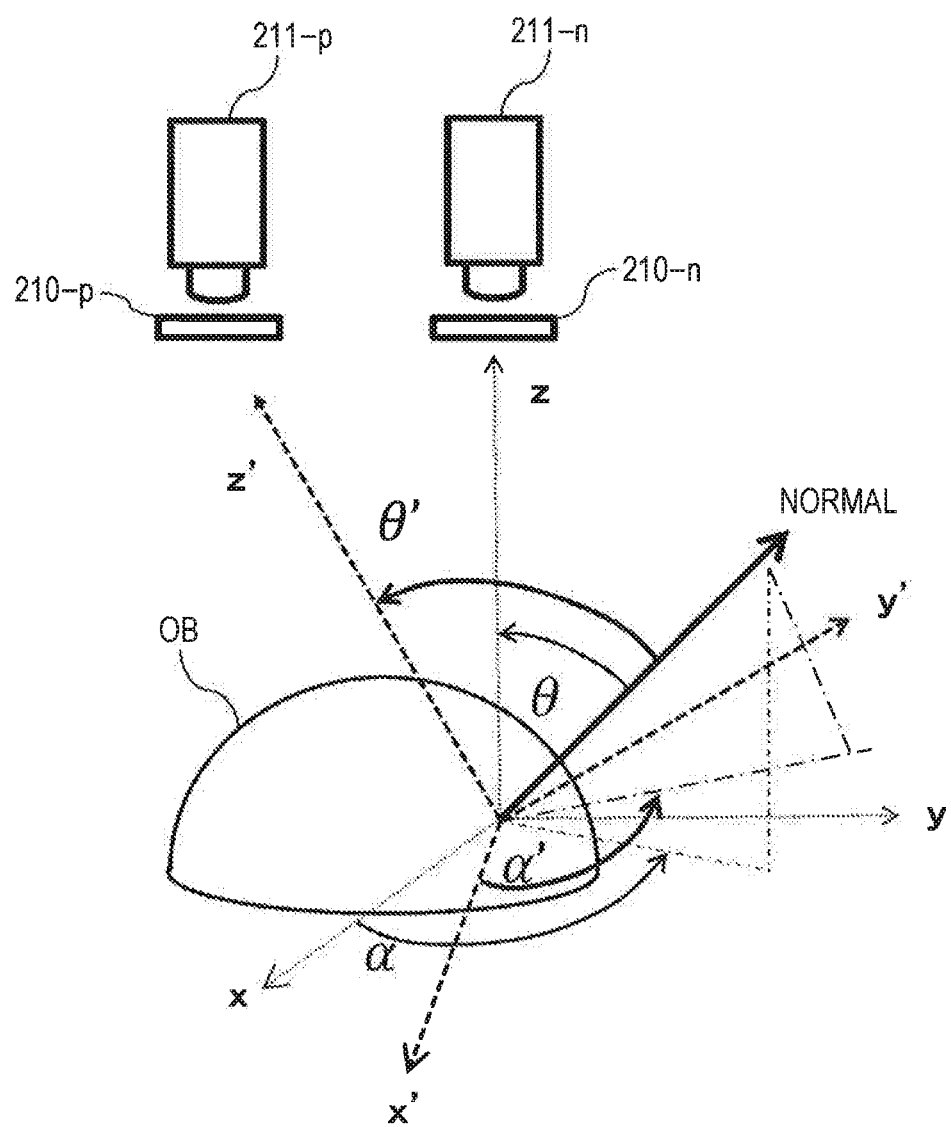
FIG. 9 is a diagram illustrating a positional relationship of the image pickup sections.

In a similar manner to the image pickup section 211-n, the model equation of the polarization characteristic expressing the relationship between luminance and the polarization angle in the image pickup section 211-p illustrated in FIG. 9 is Equation (6). Accordingly, when (Imax+Imin)−(I'max+I'min)=A, then Equations (4) and (6) become Equations (7) and (8).

[Mathematical Formula 6]

$$I' = \frac{I'_{max} + I'_{min}}{2} + \frac{I'_{max} - I'_{min}}{2}\cos 2(v - \alpha') \quad (6)$$

$$I = \frac{I_{max} + I_{min}}{2} + \frac{I_{max} - I_{min}}{2}\cos 2(v - \alpha) = \frac{A}{2} + \frac{I_{max} - I_{min}}{2}\cos 2(v - \alpha) \quad (7)$$

$$I = \quad (8)$$

$$\frac{I'_{max} - I'_{min}}{2} + \frac{I'_{max} - I'_{min}}{2}\cos 2(v - \alpha') = \frac{A}{2} + \frac{I'_{max} - I'_{min}}{2}\cos 2(v - \alpha')$$

In addition, regarding the image pickup section 211-p, the polarization degree $\rho$ is Equation (9). Accordingly, when (Imax+Imin)−(I'max+I'min)=A, then Equations (5) and (9) become Equations (10) and (11).

[Mathematical Formula 7]

$$\rho' = \frac{I'_{max} - I'_{min}}{I'_{max} + I'_{min}} = \frac{(n - 1/n)\sin^2\theta'}{2 + 2n^2 - (n + 1/n)^2\sin^2\theta' + 4\cos\theta'\sqrt{n^2 - \sin^2\theta'}} \quad (9)$$

$$\rho = \frac{I_{max} - I_{min}}{I_{max} + I_{min}} = \quad (10)$$

$$\frac{I_{max} - I_{min}}{A} = \frac{(n - 1/n)\sin^2\theta}{2 + 2n^2 - (n + 1/n)^2\sin^2\theta + 4\cos\theta\sqrt{n^2 - \sin^2\theta}}$$

$$\rho' = \frac{I'_{max} - I'_{min}}{I'_{max} + I'_{min}} = \quad (11)$$

$$\frac{I'_{max} - I'_{min}}{A} = \frac{(n - 1/n)\sin^2\theta'}{2 + 2n^2 - (n + 1/n)^2\sin^2\theta' + 4\cos\theta'\sqrt{n^2 - \sin^2\theta'}}$$

The normal of the image pickup section 211-n is the direction of the azimuth angle $\alpha$ and the zenith angle $\theta$, and the normal N detected by the image pickup section 211-n can be expressed by Equation (12). In addition, a normal N' detected by the image pickup section 211-p can be expressed by Equation (13) by using the rotation matrix R expressed by Equation (3), and thus the relationship of Equation (14) holds.

[Mathematical Formula 8]

$$N = \begin{pmatrix} n_x \\ n_y \\ n_z \end{pmatrix} = \begin{pmatrix} \cos\alpha\sin\theta \\ \sin\alpha\sin\theta \\ \cos\theta \end{pmatrix} \quad (12)$$

$$N' = \begin{pmatrix} n'_x \\ n'_y \\ n'_z \end{pmatrix} = \begin{pmatrix} \cos\alpha'\sin\theta' \\ \sin\alpha'\sin\theta' \\ \cos\theta' \end{pmatrix} \quad (13)$$

$$= RN = \begin{pmatrix} an_x + bn_y + cn_z \\ dn_x + en_y + fn_z \\ gn_x + hn_y + in_z \end{pmatrix}$$

$$= \begin{pmatrix} a\cos\alpha\sin\theta + b\sin\alpha\sin\theta + c\cos\theta \\ d\cos\alpha\sin\theta + e\sin\alpha\sin\theta + f\cos\theta \\ g\cos\alpha\sin\theta + h\sin\alpha\sin\theta + i\cos\theta \end{pmatrix}$$

$$\begin{pmatrix} \cos\alpha'\sin\theta' \\ \sin\alpha'\sin\theta' \\ \cos\theta' \end{pmatrix} = \begin{pmatrix} a\cos\alpha\sin\theta + b\sin\alpha\sin\theta + c\cos\theta \\ d\cos\alpha\sin\theta + e\sin\alpha\sin\theta + f\cos\theta \\ g\cos\alpha\sin\theta + h\sin\alpha\sin\theta + i\cos\theta \end{pmatrix} \quad (14)$$

Accordingly, an azimuth angle $\alpha'$ can be calculated by Equation (15) from components of the rotation matrix R, the zenith angle $\theta$, and the azimuth angle $\alpha$. In addition, a zenith angle $\theta'$ can be calculated by Equation (16) from the components of the rotation matrix R, the zenith angle $\theta$, and the azimuth angle $\alpha$.

[Mathematical Formula 9]

$$\alpha' = \tan^{-1}\left(\frac{d\cos\alpha\sin\theta + e\sin\alpha\sin\theta + f\cos\theta}{a\cos\alpha\sin\theta + b\sin\alpha\sin\theta + c\cos\theta}\right) \quad (15)$$

$$\theta' = \cos^{-1}(g\cos\alpha\sin\theta + h\sin\alpha\sin\theta + i\cos\theta) \quad (16)$$

Here, by using Equations (11), (15), and (16), the polarization model equation (8) indicating the polarization characteristic of the image pickup section 211-$p$ is expressed by Equation (17) as a function using three variables, a luminance additional value A, the zenith angle θ, and the azimuth angle α.

[Mathematical Formula 10]

$$I' = \frac{A}{2} + \frac{I'_{max} - I'_{min}}{2} + \cos 2(\upsilon - \alpha') = \frac{A}{2}(1 + \rho'(\theta')\cos 2(\upsilon - \alpha')) \quad (17)$$

Accordingly, similar modeling is performed about three or more image pickup sections, and by using the rotation matrix based on luminance of the polarized images obtained by picking up the subject at three or more viewpoint positions through the polarizing filters in different polarization directions at different viewpoint positions and the calibration information (positional information between the image pickup sections), the luminance additional value A, the azimuth angle α, and the zenith angle θ are calculated, which are three variables. Thus, when values of the three variables are calculated, on the basis of information such as three or more polarized images generated by the image pickup unit 21 and the calibration information, the polarization model equation indicating the polarization characteristic at the desired viewpoint position can be calculated.

The luminance additional value A, the azimuth angle α, and the zenith angle θ, which are three variables, are analytically calculated from luminance and the polarization model equation (polarization model equation using the rotation matrix between the image pickup sections based on the calibration information) about three or more image pickup sections. In addition, the three variables may be calculated so as to minimize an error by using an optimization technique, for example, the LM method and the steepest descent method. Furthermore, the three variables may be approximately calculated assuming that spacing between the image pickup sections is small compared with the depth and the rotation matrix can be ignored.

The polarization characteristic acquisition unit 24 performs the above-described processing, and calculates the polarization model equation for the desired viewpoint position, that is, the polarization model equation for the image pickup section 211-$p$, which is the polarization characteristic.

Figure 13:
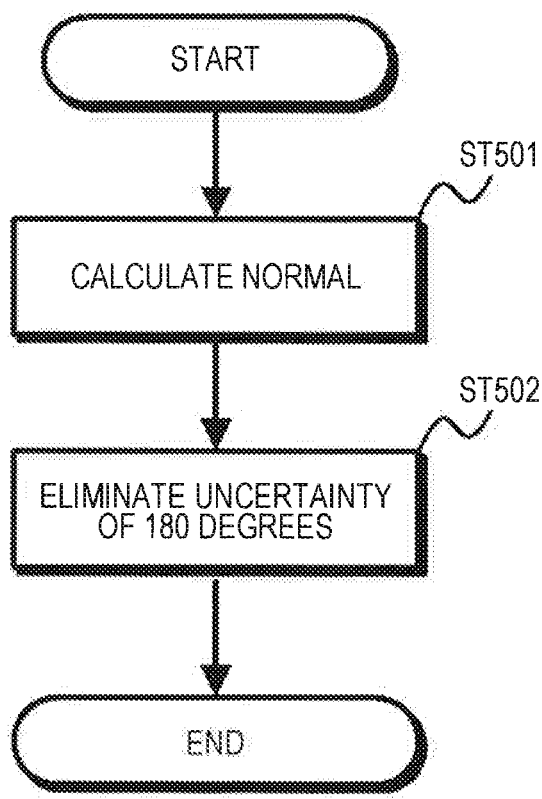
FIG. 13 is a flowchart illustrating normal map generation processing.

Returning to FIG. 4, in step ST50, the normal map generation unit 25 performs normal map generation processing. FIG. 13 is a flowchart illustrating the normal map generation processing. In step ST501, the normal map generation unit 25 calculates the normal. The normal map generation unit 25 determines the azimuth angle α' at which luminance becomes highest by using the polarization model equation indicating the polarization characteristic at the desired viewpoint position, that is, Equation (17). Note that a polarization degree ρ' may be calculated by Equation (11). The normal map generation unit 25 calculates the zenith angle θ' for each pixel on the basis of the azimuth angle α' and the polarization degree ρ' at which luminance becomes highest, calculates the normal information on the subject (information indicating the azimuth angle α' and the zenith angle θ'), and then proceeds to step ST502.

In step ST502, the normal map generation unit 25 eliminates the uncertainty of 180 degrees. FIGS. 14($a$) to 14 ($c$) are each a diagram for describing elimination of the uncertainty of 180 degrees. As illustrated in (a) of FIG. 14, the image pickup section 211 picks up the subject OB. Here, when the polarization direction of the polarizing plate is rotated by 180 degrees, the polarizing plate will return to an original polarization state, and for example, as illustrated in (b) of FIG. 14, in an upper half region GA of the subject OB, a normal direction (indicated by arrows) is a right direction. On the other hand, in a lower half region GB, there is a possibility that the normal direction may be opposite, and the uncertainty of 180 degrees is present. Here, when the normal map generation unit 25 determines a gradient direction of the subject OB on the basis of the depth map, the normal map generation unit 25 can determine that the subject OB is a shape projecting in a direction of the image pickup section. In addition, since the subject OB has a shape projecting in the direction of the image pickup section, the normal map generation unit 25 can determine that the normal direction of the lower half region GB illustrated in (b) of FIG. 14 is an opposite direction. Accordingly, by reversing the normal direction of the lower half region GB, the normal map generation unit 25 eliminates the uncertainty of 180 degrees, as illustrated in (c) of FIG. 14. Thus, the normal map generation unit 25 eliminates the uncertainty of 180 degrees from the normal calculated in step ST501 on the basis of the depth map, and generates the normal map that correctly indicates the surface shape of the subject.

Note that the image processing apparatus not only performs the above-described processing in order of steps, but also may perform, for example, processing such as acquisition of images and information, and generation of the depth map by parallel processing. In addition, performing the above-described processing by pipeline processing makes it possible to calculate the polarization characteristic at the desired viewpoint position and to generate the normal map, for example, sequentially for each frame By performing the above-described processing, the first embodiment allows acquisition of the polarization characteristic for each pixel at the desired viewpoint position without causing reduction in temporal resolution and spatial resolution. In addition, the first embodiment allows generation of the normal information on the subject from the polarization characteristic at the desired viewpoint position. Furthermore, the first embodiment allows acquisition of the polarization characteristic with high precision, because the polarization characteristic is acquired by integrating the depth map generated through combination and use of the polarized images in different polarization directions at different viewpoint positions and using the polarized images aligned using the integrated depth map.

In addition, the first embodiment allows generation of the normal map on the basis of the polarization characteristic at the desired viewpoint position, thereby allowing generation of the normal map according to the desired viewpoint position. Since this normal map corresponds to the characteristic amount according to the subject surface shape, it becomes possible to perform processing such as subject recognition and subject matching processing with high precision by using this normal map.

Note that in the first embodiment, since the depth map is generated by using the polarized images, it is not necessary to provide image pickup sections to be used only for generation of the depth map.

2. SECOND EMBODIMENT

Next, a second embodiment will be described. The second embodiment describes a case of generating a depth map with high spatial resolution by using a generated normal map.

[2-1. Configuration of Second Embodiment]

Figure 15:
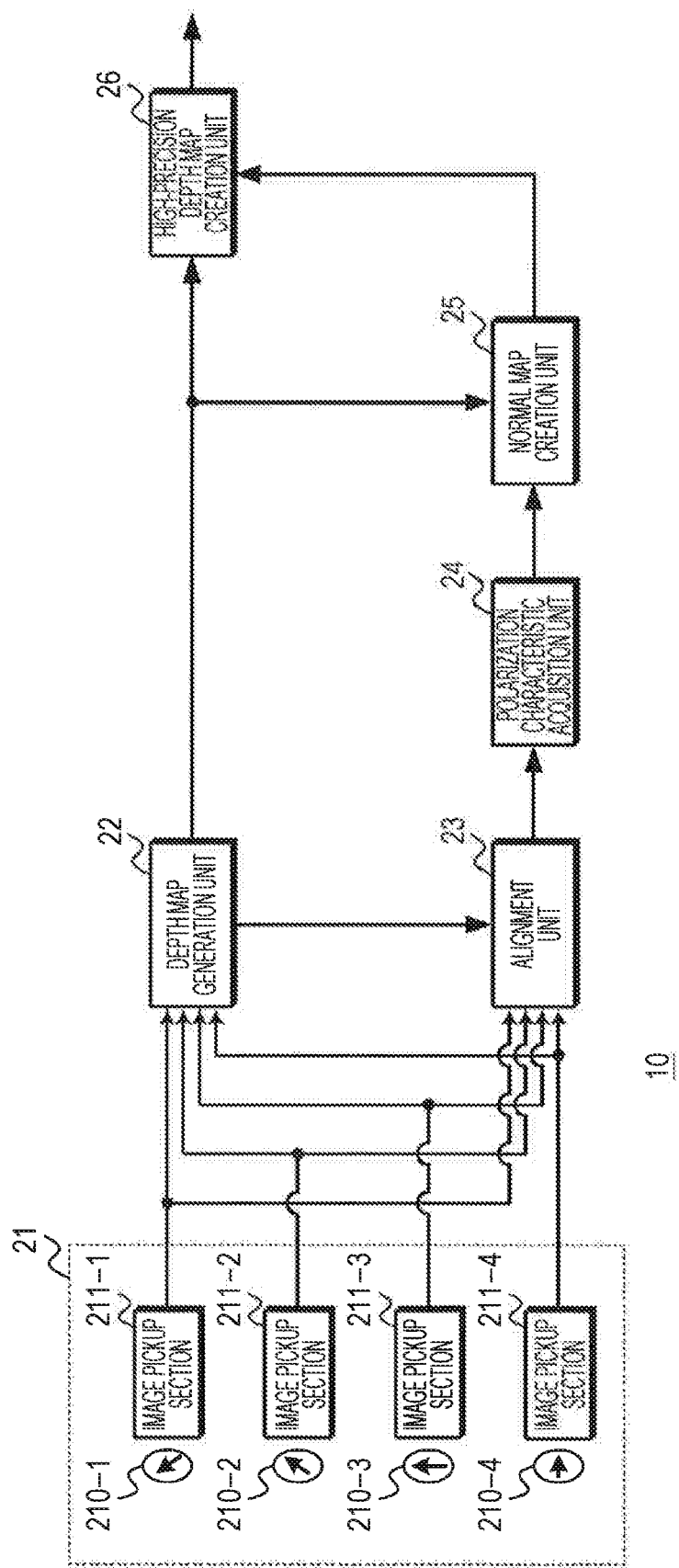
FIG. 15 is a diagram illustrating a functional configuration of a second embodiment.

FIG. 15 is a diagram illustrating a functional configuration of the second embodiment of the present technology. In a similar manner to the first embodiment, an image processing apparatus 10 includes an image pickup unit 21, a depth map generation unit 22, an alignment unit 23, a polarization characteristic acquisition unit 24, and a normal map generation unit 25. In addition, the image processing apparatus 10 of the second embodiment includes a high-precision depth map generation unit 26.

The image pickup unit 21 picks up a subject at a plurality of viewpoint positions through polarizing filters in different polarization directions at different viewpoint positions (for example, polarizing plates) and generates polarized images. The image pickup unit 21 includes a plurality of image pickup sections, for example, four image pickup sections 211-1 to 211-4 so as to generate polarized images in three or more different polarization directions. A polarizing plate 210-1 is provided in front of the image pickup section 211-1. Similarly, polarizing plates 210-2 to 210-4 are provided in front of the image pickup sections 211-2 to 211-4, respectively. The polarizing plates 210-1 to 210-4 are provided in polarization directions different from one another. The image pickup sections 211-1 to 211-4 generate polarized images in the polarization directions different from one another. The image pickup unit 21 outputs image data of the polarized images generated by the image pickup sections 211-1 to 211-4 to the depth map generation unit 22 and the alignment unit 23. The image pickup unit 21 uses, for example, linear polarizing plates or the like as the polarizing filters. Note that the image pickup unit 21 may generate polarized images in three or more different polarization directions with another configuration in a similar manner to the above-described first embodiment.

The depth map generation unit 22 generates a depth map indicating distance information on the subject from the polarized images at different viewpoint positions generated by the image pickup unit 21. The depth map generation unit 22 performs stereo matching processing by using the polarized images at different viewpoint positions to generate the depth map indicating depth at each pixel. In addition, the depth map generation unit 22 generates the depth map for each pair of polarized images at different viewpoint positions and integrates the generated depth map to generate the depth map with higher precision than before integration. The depth map generation unit 22 outputs the depth map after integration to the alignment unit 23 and the normal map generation unit 25.

The alignment unit 23 aligns the polarized images generated by the image pickup unit 21 on the basis of the depth map generated by the depth map generation unit 22. The alignment unit 23 determines parallax between the polarized images on the basis of the depth in the depth map generated by the depth map generation unit 22 and a positional relationship of the image pickup sections indicated in the calibration information acquired in advance, and aligns the polarized images at each pixel. The alignment unit 23 outputs the polarized images after alignment to the polarization characteristic acquisition unit 24.

The polarization characteristic acquisition unit 24 acquires the polarization characteristic of the subject from a desired viewpoint position by using the polarized images after alignment. The polarization characteristic acquisition unit 24 calculates a rotation matrix with the image pickup sections as the desired viewpoint position on the basis of the positional relationship of the image pickup sections indicated in the calibration information and the depth map. In addition, the polarization characteristic acquisition unit 24 calculates a polarization model equation indicating the polarization characteristic of the subject from the desired viewpoint position from information such as the polarization directions and luminance of the plurality of polarized images, and the rotation matrix indicating the positional relationship between the image pickup sections that generate the polarized images and the desired viewpoint position. The polarization characteristic acquisition unit 24 outputs the acquired polarization model equation, which is the polarization characteristic, to the normal map generation unit 25.

The normal map generation unit 25 generates the normal map of the subject on the basis of the polarization characteristic of the subject from the desired viewpoint position acquired by the polarization characteristic acquisition unit 24. The normal map generation unit 25 calculates a zenith angle at each pixel on the basis of an azimuth angle at which luminance becomes highest and a polarization degree from the polarization model equation acquired by the polarization characteristic acquisition unit 24, and generates the normal map that stores normal information indicating a normal direction (azimuth angle and zenith angle). Furthermore, the normal map generation unit 25 eliminates uncertainty of 180 degrees in the normal map by using the depth map, and outputs the normal map from which uncertainty of 180 degrees is eliminated to the high-precision depth map generation unit 26.

The high-precision depth map generation unit 26 performs precision-enhancing processing of the depth map by using the normal map. The high-precision depth map generation unit 26 traces a subject surface shape starting from a pixel at which depth is obtained on the basis of the subject surface shape indicated in the normal map generated by the normal map generation unit 25 and depth indicated in the depth map that is output from the depth map generation unit 22. Thus, the subject surface shape is traced starting from the pixel at which depth is obtained, and the normal map generation unit 25 estimates depth corresponding to the pixel at which depth is not obtained. In addition, by including the estimated depth in the depth map that is output from the depth map generation unit 22, the high-precision depth map generation unit 26 generates the depth map that is higher in spatial resolution than the depth map that is output from the depth map generation unit 22.

[2-2. Operation of Second Embodiment]

Figure 16:
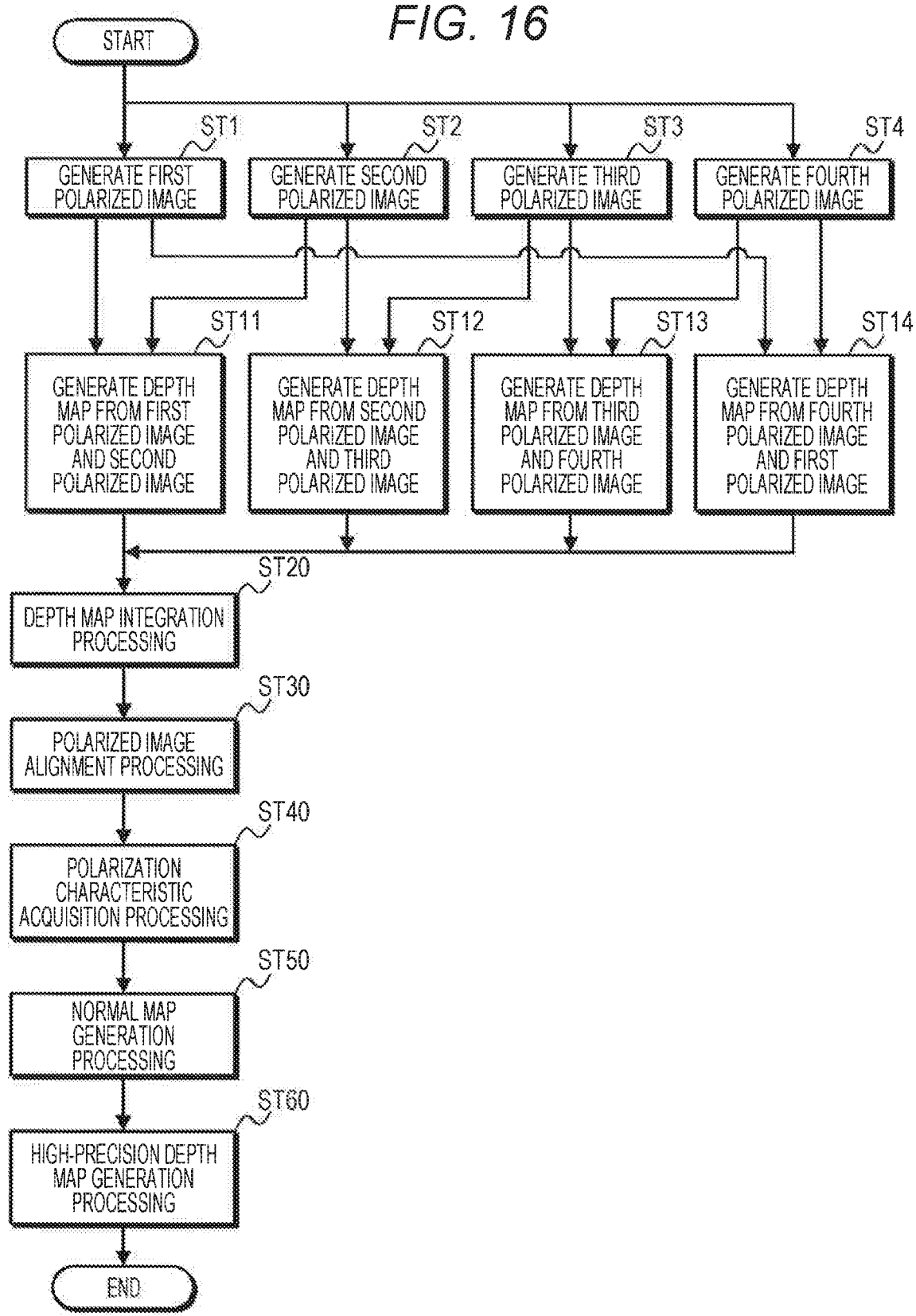
FIG. 16 is a flowchart illustrating an operation of the second embodiment.

Next, an operation of the second embodiment will be described. FIG. 16 is a flowchart illustrating the operation of the second embodiment. In a similar manner to the first embodiment, in step ST1 to step ST4, the image pickup unit 21 generates the polarized images. For example, in step ST1, the image pickup section 211-1 of the image pickup unit 21 generates a first polarized image. In step ST2, the image pickup section 211-2 generates a second polarized image. In step ST3, the image pickup section 211-3 generates a third polarized image. In step ST4, the image pickup section 211-4 generates a fourth polarized image. Thus, the image pickup sections 211-1 to 211-4 generate the polarized images in different polarization directions at different viewpoint positions, and then the image processing apparatus 10 proceeds to step ST11 to step ST14.

In step ST11 to step ST14, the depth map generation unit 22 generates the depth maps. The depth map generation unit 22 generates the depth map from two polarized images at different viewpoint positions, and then proceeds to step ST20. Note that pairs of polarized images are not limited to a combination illustrated in FIG. 16.

In step ST20, the depth map generation unit 22 performs depth map integration processing. The depth map generation unit 22 integrates the depth maps generated in step ST11 to step ST14, and then proceeds to step ST30.

In step ST30, the alignment unit 23 performs polarized image alignment processing. The alignment unit 23 aligns the polarized images by using the depth map after integration, and then proceeds to step ST40.

In step ST40, the polarization characteristic acquisition unit 24 performs polarization characteristic acquisition processing. The polarization characteristic acquisition unit 24 calculates the polarization model equation for the desired viewpoint position by using the polarized images after alignment, and then proceeds to step ST50.

In step ST50, the normal map generation unit 25 performs normal map generation processing. The normal map generation unit 25 generates the normal map indicating a surface normal of the subject at each pixel on the basis of the polarization characteristic at the desired viewpoint position, and then proceeds to step ST60.

In step ST60, the high-precision depth map generation unit 26 performs high-precision depth map generation processing. The high-precision depth map generation unit 26 generates the depth map with high spatial resolution from the depth map generated in step ST20 and the normal map generated in step ST50.

FIGS. 17 (a) to 17 (d) are each a diagram for describing the high-precision depth map generation processing. Note that for simple description, for example, processing about one line will be described. As illustrated in (a) of FIG. 17, it is assumed that the image pickup section 211 picks up the subject OB, that the depth map illustrated in (b) of FIG. 17 is obtained by the depth map generation unit 22, and that the normal map illustrated in (c) of FIG. 17 is obtained by the normal map generation unit 25. In addition, in the depth map, it is assumed that, for example, depth at a left end pixel is "2 (meters)", and that depth is not stored at other pixels denoted with "x." The high-precision depth map generation unit 26 estimates the surface shape of the subject OB on the basis of the normal map. Here, it can be determined that a second pixel from the left end corresponds to an inclined surface approaching in a direction of the image pickup unit 21 from the subject surface corresponding to the left end pixel on the basis of the normal direction of this pixel. Therefore, the high-precision depth map generation unit 26 estimates depth of the second pixel from the left end at, for example, "1.5 (meters)", by tracing the surface shape of the subject OB starting from the left end pixel. In addition, the high-precision depth map generation unit 26 stores the estimated depth in the depth map. It can be determined that a third pixel from the left end corresponds to a surface facing the image pickup unit 21 on the basis of the normal direction of this pixel. Therefore, the high-precision depth map generation unit 26 estimates depth of the third pixel from the left end at, for example, "1 (meter)", by tracing the surface shape of the subject OB starting from the left end pixel. In addition, the high-precision depth map generation unit 26 stores the estimated depth in the depth map. It can be determined that a fourth pixel from the left end corresponds to an inclined surface in a direction away from the image pickup unit 21 from the subject surface corresponding to the third pixel from the left end. Therefore, the high-precision depth map generation unit 26 estimates depth of the fourth pixel from the left end pixel at, for example, "1.5 (meters)", by tracing the surface shape of the subject OB starting from the left end pixel. In addition, the high-precision depth map generation unit 26 stores the estimated depth in the depth map. Similarly, depth of a fifth pixel from the left end is estimated at, for example, "2 (meters)" and is stored in the depth map.

Thus, the high-precision depth map generation unit 26 performs precision-enhancing processing of the depth map by using the depth map and the normal map, and traces the surface shape starting from the depth included in the depth map on the basis of the normal map, thereby estimating the depth. Therefore, even if some depth is missing in the depth map illustrated in (b) of FIG. 17 generated by the depth map generation unit 22, the high-precision depth map generation unit 26 can compensate for the missing depth. Accordingly, the depth map illustrated in (d) of FIG. 17, which has a spatial resolution equal to or higher than the depth map illustrated in (b) of FIG. 17, can be generated.

As described above, according to the second embodiment, not only an operational effect of the first embodiment can be obtained, but also even in a subject region where it is difficult to obtain depth by the stereo matching processing, it is possible to estimate depth by using the normal map generated on the basis of the plurality of polarized images. Therefore, it is possible to generate the depth map having a spatial resolution equal to or higher than the depth map generated by the depth map generation unit 22.

3. THIRD EMBODIMENT

Next, a third embodiment will be described. In the third embodiment, by using images picked up without through polarizing filters to generate a depth map, the depth map is generated without being affected by a luminance difference of polarized images.

[3-1. Configuration of Third Embodiment]

Figure 18:
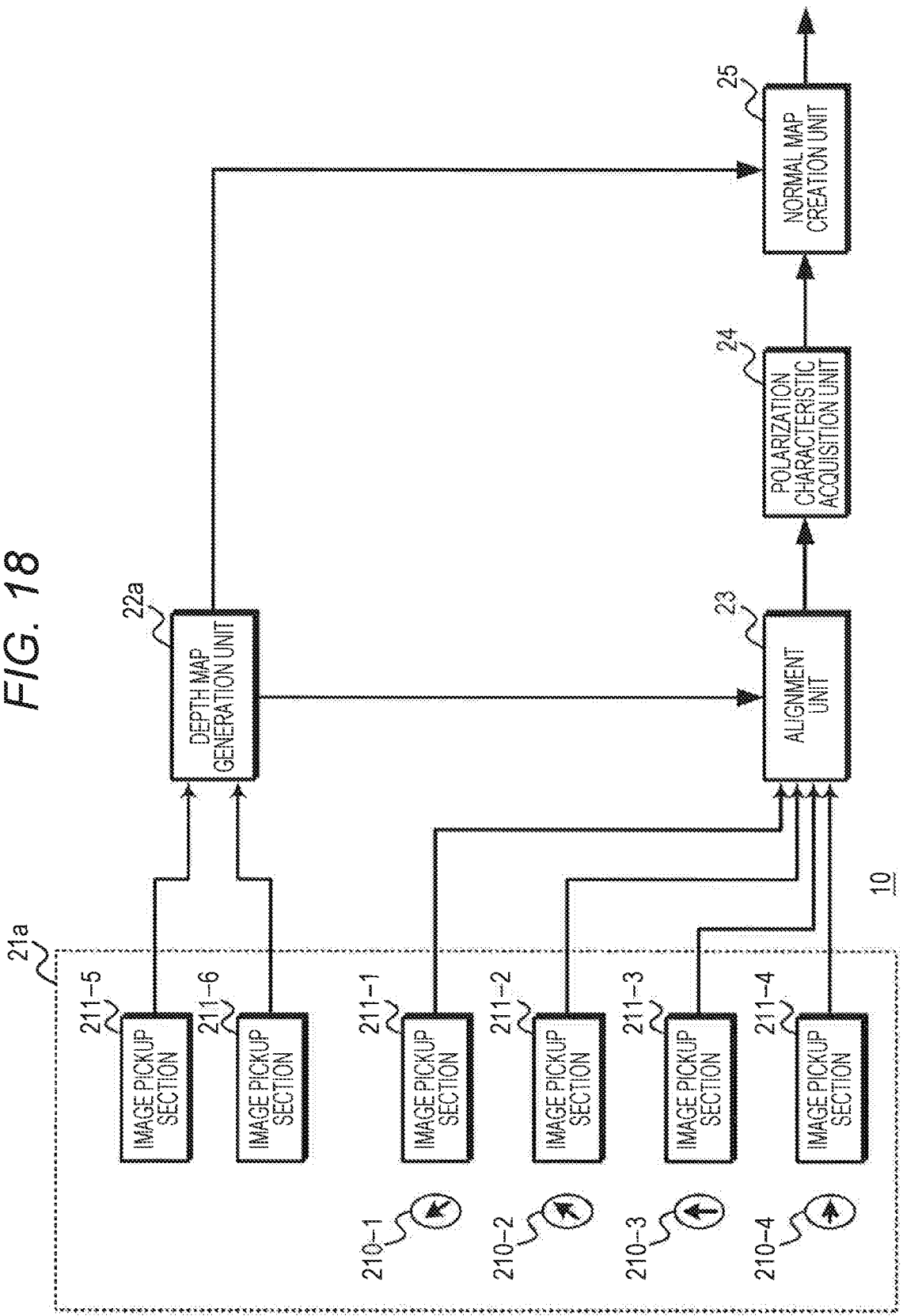
FIG. 18 is a diagram illustrating a functional configuration of a third embodiment.

FIG. 18 is a diagram illustrating a functional configuration of the third embodiment. An image processing apparatus 10 includes an image pickup unit 21a, a depth map generation unit 22a, and in a similar manner to the first embodiment, an alignment unit 23, a polarization characteristic acquisition unit 24, and a normal map generation unit 25.

The image pickup unit 21a picks up a subject at a plurality of viewpoint positions through polarizing filters in different polarization directions at different viewpoint positions (polarizing plates) and generates polarized images. The image pickup unit 21a includes a plurality of image pickup sections, for example, four image pickup sections 211-1 to 211-4 so as to generate polarized images in three or more different polarization directions. A polarizing plate 210-1 is provided in front of the image pickup section 211-1. Similarly, polarizing plates 210-2 to 210-4 are provided in front of the image pickup sections 211-2 to 211-4, respectively. The polarizing plates 210-1 to 210-4 are provided in polarization directions different from one another. The image pickup sections 211-1 to 211-4 generate polarized images in the polarization directions different from one another. The image pickup unit 21a outputs image data of the polarized images generated by the image pickup sections 211-1 to 211-4 to the alignment unit 23. The image pickup unit 21a uses, for example, linear polarizing plates or the like as the polarizing filters. Note that the image pickup unit 21a may generate polarized images in three or more different polarization directions with another configuration in a similar manner to the above-described first embodiment.

Furthermore, the image pickup unit 21a includes image pickup sections that perform image pickup without through polarizing filters or through polarizing filters in an identical polarization direction. Note that FIG. 18 illustrates a configuration including image pickup sections 211-5 and 211-6 that perform image pickup without through polarizing filters. Polarizing filters are not provided in front of the image pickup sections 211-5 and 211-6, and the image pickup sections 211-5 and 211-6 generate unpolarized images. The image pickup unit 21a outputs the unpolarized images generated by the image pickup sections 211-5 and 211-6 to the depth map generation unit 22a.

FIGS. 19(a) to 19(e) are each a diagram illustrating arrangement of the image pickup sections in the image pickup unit 21a. The image pickup unit 21a has a configuration in which the image pickup sections 211-1 to 211-4 are arranged at four corners of a rectangle as illustrated in (a) of FIG. 19, and the image pickup section 211-5 is arranged on a left side of the image pickup sections 211-1 to 211-4 that are arranged in a rectangle, and the image pickup section 211-6 is arranged on a right side. Note that FIGS. 19(a) to 19(e) illustrate that the image pickup sections without arrows indicating polarization directions are the image pickup sections that generate unpolarized images.

Figure 19:
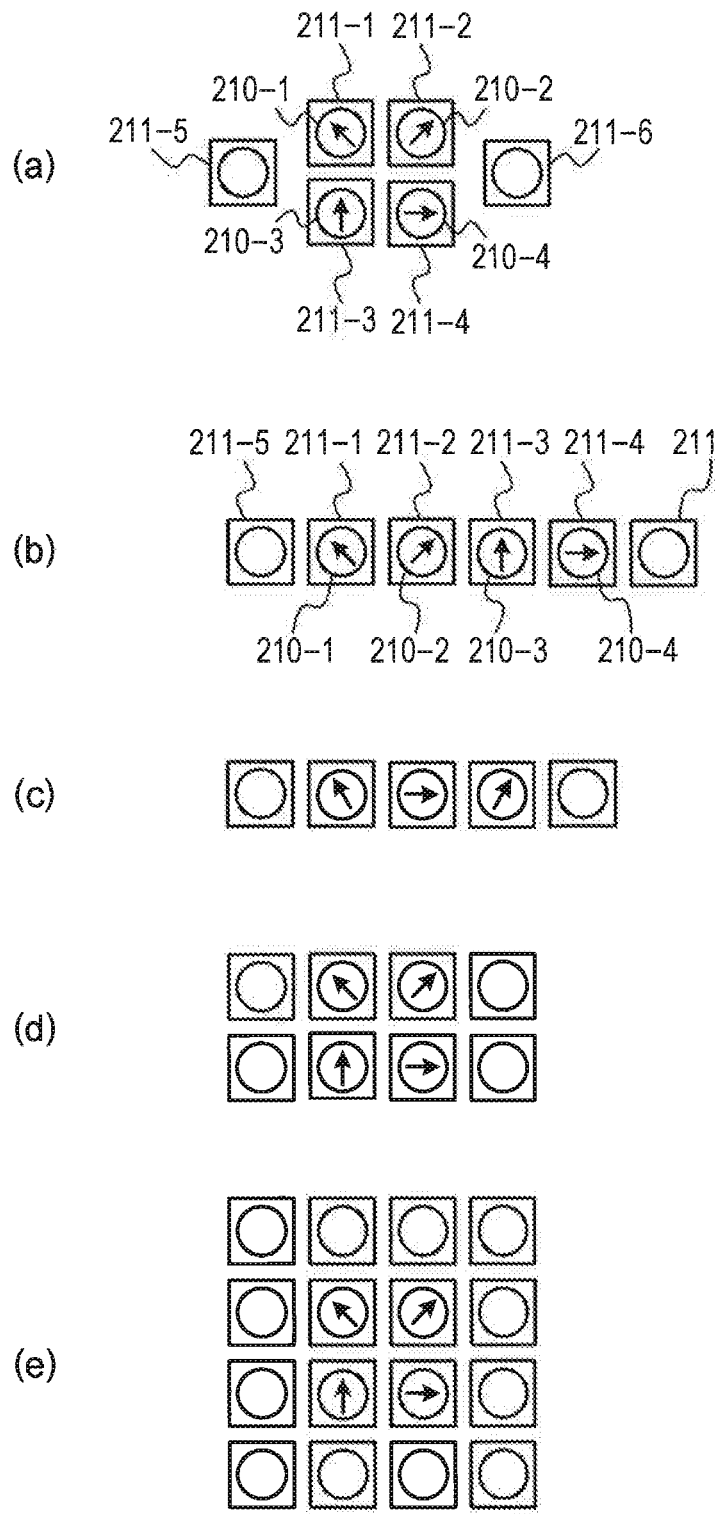
FIGS. 19(a) to 19(e) are each a diagram illustrating arrangement of the image pickup sections.

In addition, the image pickup unit 21a may have a configuration in which the image pickup sections that generate polarized images are arranged in a straight line as illustrated in (b) and (c) of FIG. 19, and the image pickup sections that generate unpolarized images are arranged on the left side and right side of the image pickup sections arranged in a straight line.

Furthermore, the image pickup unit 21a may have a configuration in which more image pickup sections are provided that generate unpolarized images, depth maps generated for each pair of the unpolarized images are integrated, and a higher-precision depth map can be generated. For example, a configuration is used in which, as illustrated in (d) of FIG. 19, two image pickup sections that generate unpolarized images are provided in a vertical direction on the right and left of the image pickup sections that are arranged in a rectangle and generate polarized images, and a plurality of depth maps generated for each pair of the unpolarized images can be integrated to generate a high-precision depth map. Furthermore, a configuration may be used in which, as illustrated in (e) of FIG. 19, image pickup sections that generate unpolarized images are provided so as to surround image pickup sections that are arranged in a rectangle and generate polarized images, and a plurality of depth maps generated for each pair of the unpolarized images can be integrated to generate a high-precision depth map. Note that the image pickup sections that generate unpolarized images may be arranged in any manner without limitation to the arrangement illustrated in (d) and (e) of FIG. 19 as long as the plurality of depth maps can be integrated to generate a high-precision depth map.

The depth map generation unit 22a generates the depth map indicating distance information on the subject from the unpolarized images generated by the image pickup unit 21a. The depth map generation unit 22a performs stereo matching processing by using the unpolarized images at different viewpoint positions and generates the depth map indicating depth at each pixel. The depth map generation unit 22a outputs the generated depth map to the alignment unit 23 and the normal map generation unit 25. In addition, when there are a plurality of pairs of unpolarized images, the depth map generation unit 22a may generate the depth maps for respective pairs, perform depth map integration processing as described above, thereby generating the high-precision depth map.

The alignment unit 23 aligns the polarized images generated by the image pickup unit 21a on the basis of the depth map generated by the depth map generation unit 22a. The alignment unit 23 determines parallax between the polarized images and aligns the polarized images at each pixel on the basis of depth in the depth map generated by the depth map generation unit 22a and a positional relationship of the image pickup sections indicated using calibration information acquired in advance. The alignment unit 23 outputs the polarized images after alignment to the polarization characteristic acquisition unit 24.

The polarization characteristic acquisition unit 24 acquires the polarization characteristic of the subject from a desired viewpoint position by using the polarized images after alignment. The polarization characteristic acquisition unit 24 calculates a rotation matrix with the image pickup sections as the desired viewpoint position on the basis of the positional relationship of the image pickup sections indicated using the calibration information and the depth map. In addition, the polarization characteristic acquisition unit 24 calculates a polarization model equation indicating the polarization characteristic of the subject from the desired viewpoint position from information such as the polarization directions and luminance of the plurality of polarized images and the rotation matrix indicating the positional relationship between the image pickup sections that generate these polarized images and the desired viewpoint position. The polarization characteristic acquisition unit 24 outputs the acquired polarization model equation, which is the polarization characteristic, to the normal map generation unit 25.

The normal map generation unit 25 generates a normal map of the subject on the basis of the polarization characteristic of the subject from the desired viewpoint position acquired by the polarization characteristic acquisition unit 24. The normal map generation unit 25 calculates a zenith angle for each pixel on the basis of an azimuth angle at which luminance becomes highest and a polarization degree from the polarization model equation acquired by the polarization characteristic acquisition unit 24, and generates the normal map that stores normal information indicating a normal direction (azimuth angle and zenith angle). Furthermore, the normal map generation unit 25 eliminates uncertainty of 180 degrees in the normal map by using the depth map, and generates the normal map from which the uncertainty of 180 degrees is eliminated.

[3-2. Operation of Third Embodiment]

Figure 20:
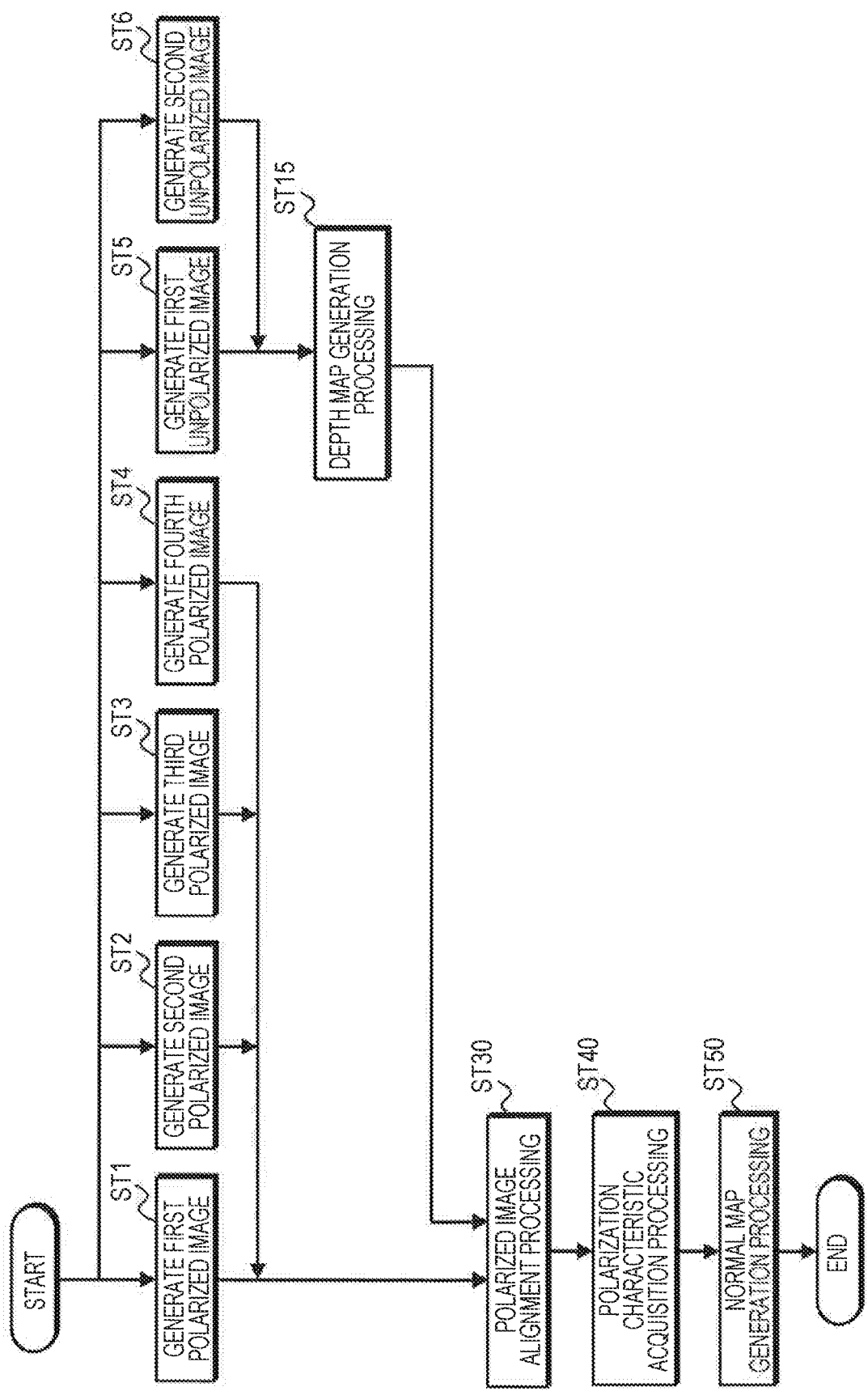
FIG. 20 is a flowchart illustrating an operation of the third embodiment.

Next, an operation of the third embodiment will be described. FIG. 20 is a flowchart illustrating the operation of the third embodiment. In a similar manner to the first embodiment, in step ST1 to step ST4, the image pickup unit 21a generates the polarized images. For example, in step ST1, the image pickup section 211-1 of the image pickup unit 21a generates a first polarized image. In step ST2, the image pickup section 211-2 generates a second polarized image. In step ST3, the image pickup section 211-3 generates a third polarized image. In step ST4, the image pickup section 211-4 generates a fourth polarized image. In addition, in step ST5 to step ST6, the image pickup unit 21a generates the unpolarized images without through the polarizing filters. For example, in step ST5, the image pickup section 211-5 of the image pickup unit 21a generates a first unpolarized image. In step ST6, the image pickup section 211-6 generates a second unpolarized image. Thus, in the image processing apparatus 10, the image pickup sections 211-1 to 211-6 generate the plurality of polarized images in different polarization directions at different viewpoint positions and the unpolarized images at different viewpoint positions, and then the image processing apparatus 10 proceeds to step ST15.

In step ST15, the depth map generation unit 22a generates the depth map. The depth map generation unit 22a performs stereo matching processing by using the first unpolarized image and the second unpolarized image at different viewpoint positions, generates the depth map, and then proceeds to step ST30.

In step ST30, the alignment unit 23 performs polarized image alignment processing. The alignment unit 23 aligns respective polarized images by using the depth map generated in step ST15, and then proceeds to step ST40.

In step ST40, the polarization characteristic acquisition unit 24 performs polarization characteristic acquisition processing. The polarization characteristic acquisition unit 24 calculates the polarization model equation for the desired viewpoint position by using the polarized images after alignment, and then proceeds to step ST50.

In step ST50, the normal map generation unit 25 performs normal map generation processing. The normal map generation unit 25 generates the normal map indicating a surface normal of the subject for each pixel on the basis of the polarization characteristic at the desired viewpoint position.

As described above, according to the third embodiment, since the depth map is generated using the unpolarized images, the depth map can be easily generated with high precision compared with a case where the polarized images are used that can produce a difference in luminance depending on the polarization direction. In addition, in a similar manner to the first embodiment, the polarization characteristic at the desired viewpoint position can be acquired for each pixel with high precision, without causing reduction in temporal resolution and spatial resolution.

4. FOURTH EMBODIMENT

Next, a fourth embodiment will be described. The fourth embodiment describes a case of performing processing using an acquired polarization characteristic at a desired viewpoint position.

[4-1. Configuration of Fourth Embodiment]

Figure 21:
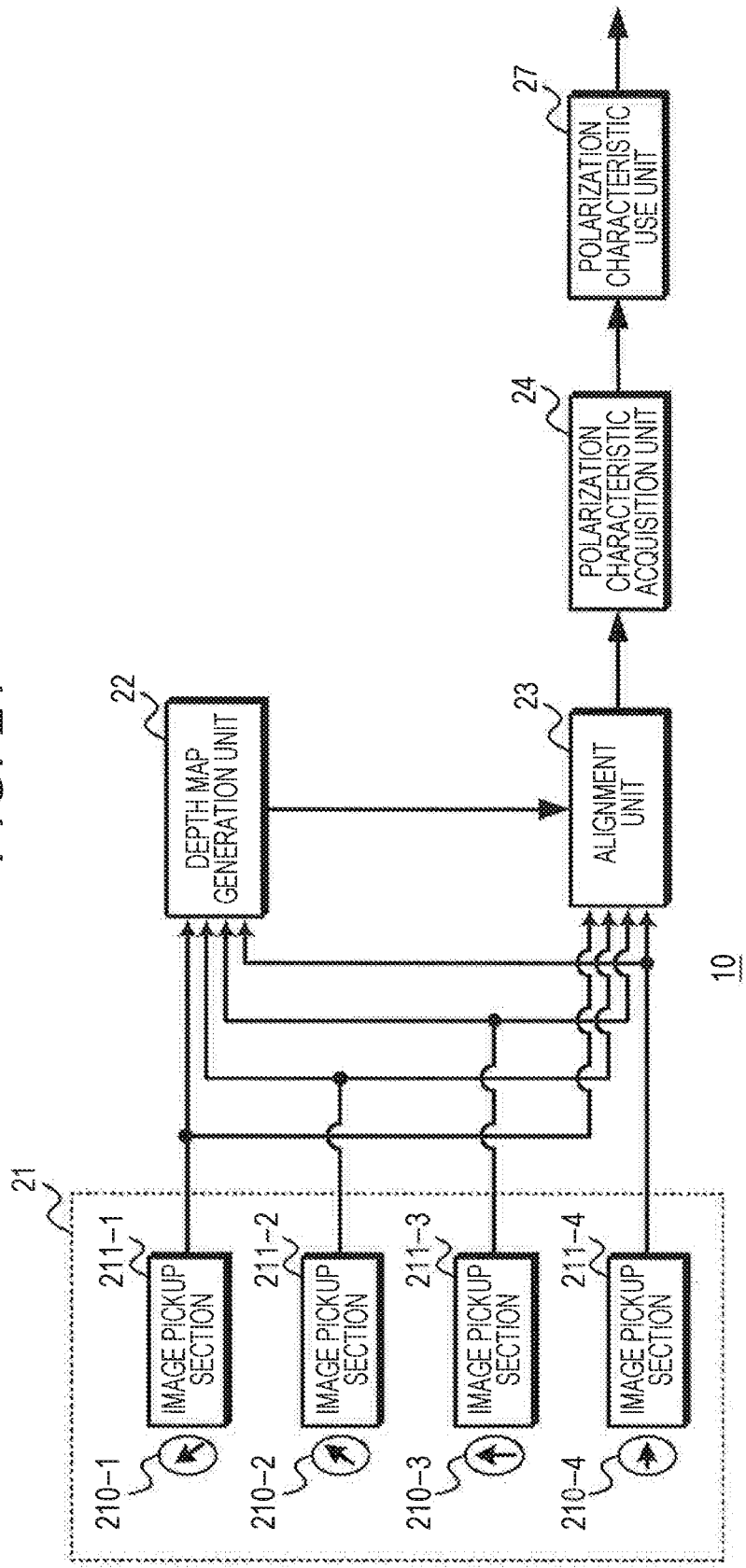
FIG. 21 is a diagram illustrating a functional configuration of a fourth embodiment.

FIG. 21 is a diagram illustrating a functional configuration of the fourth embodiment. In a similar manner to the first embodiment, an image processing apparatus 10 includes an image pickup unit 21, a depth map generation unit 22, an alignment unit 23, and a polarization characteristic acquisition unit 24. In addition, the image processing apparatus 10 of the fourth embodiment includes a polarization characteristic use unit 27.

The image pickup unit 21 picks up a subject at a plurality of viewpoint positions through polarizing filters in different polarization directions at different viewpoint positions (for example, polarizing plates) and generates polarized images. The image pickup unit 21 includes a plurality of image pickup sections, for example, four image pickup sections 211-1 to 211-4 so as to generate polarized images in three or more different polarization directions. A polarizing plate 210-1 is provided in front of the image pickup section 211-1. Similarly, polarizing plates 210-2 to 210-4 are provided in front of the image pickup sections 211-2 to 211-4, respectively. The polarizing plates 210-1 to 210-4 are provided in polarization directions different from one another. The image pickup sections 211-1 to 211-4 generate polarized images in the polarization directions different from one another. The image pickup unit 21 outputs image data of the polarized images generated by the image pickup sections 211-1 to 211-4 to the depth map generation unit 22 and the alignment unit 23. The image pickup unit 21 uses, for example, linear polarizing plates or the like as the polarizing filters. Note that the image pickup unit 21 may generate polarized images in three or more different polarization directions with another configuration in a similar manner to the above-described first embodiment.

The depth map generation unit 22 generates a depth map indicating distance information on the subject from the polarized images at different viewpoint positions generated by the image pickup unit 21. The depth map generation unit 22 performs stereo matching processing by using the polarized images at different viewpoint positions to generate the depth map indicating depth at each pixel. In addition, the depth map generation unit 22 generates the depth map for each pair of polarized images at different viewpoint positions and integrates the generated depth map to generate the depth map with higher precision than before integration. The depth map generation unit 22 outputs the depth map after integration to the alignment unit 23 and a normal map generation unit 25.

The alignment unit 23 aligns the polarized images generated by the image pickup unit 21 on the basis of the depth map generated by the depth map generation unit 22. The alignment unit 23 determines parallax between the polarized images on the basis of the depth in the depth map generated by the depth map generation unit 22 and a positional relationship of the image pickup sections indicated in the calibration information acquired in advance, and aligns the polarized images at each pixel. The alignment unit 23 outputs the polarized images after alignment to the polarization characteristic acquisition unit 24.

The polarization characteristic acquisition unit 24 acquires the polarization characteristic of the subject from a desired viewpoint position by using the polarized images after alignment. The polarization characteristic acquisition unit 24 calculates a rotation matrix with the image pickup sections as the desired viewpoint position on the basis of the positional relationship of the image pickup sections indicated in the calibration information and the depth map. In addition, the polarization characteristic acquisition unit 24 calculates a polarization model equation indicating the polarization characteristic of the subject from the desired viewpoint position from information such as the polarization directions and luminance of the plurality of polarized images, and the rotation matrix indicating the positional relationship between the image pickup sections that generate the polarized images and the desired viewpoint position. The polarization characteristic acquisition unit 24 outputs the acquired polarization model equation, which is the polarization characteristic, to the polarization characteristic use unit The polarization characteristic use unit 27 uses the polarization characteristic acquired by the polarization characteristic acquisition unit 24 to perform modification processing on images generated by the image pickup unit 21, such as adjustment of a reflection component of an image at the desired viewpoint position, for example. Specifically, modification processing are performed such as processing for generating a polarized image of an arbitrary azimuth angle, processing for eliminating the reflection component, and processing for adjusting a specular reflection component and adjusting glossiness. In addition, the polarization characteristic use unit 27 may use the polarization characteristic according to a surface shape of the subject as an image characteristic amount to perform processing such as processing in consideration of the surface shape of the subject and recognition of a three-dimensional subject.

[4-2. Operation of Fourth Embodiment]

Figure 22:
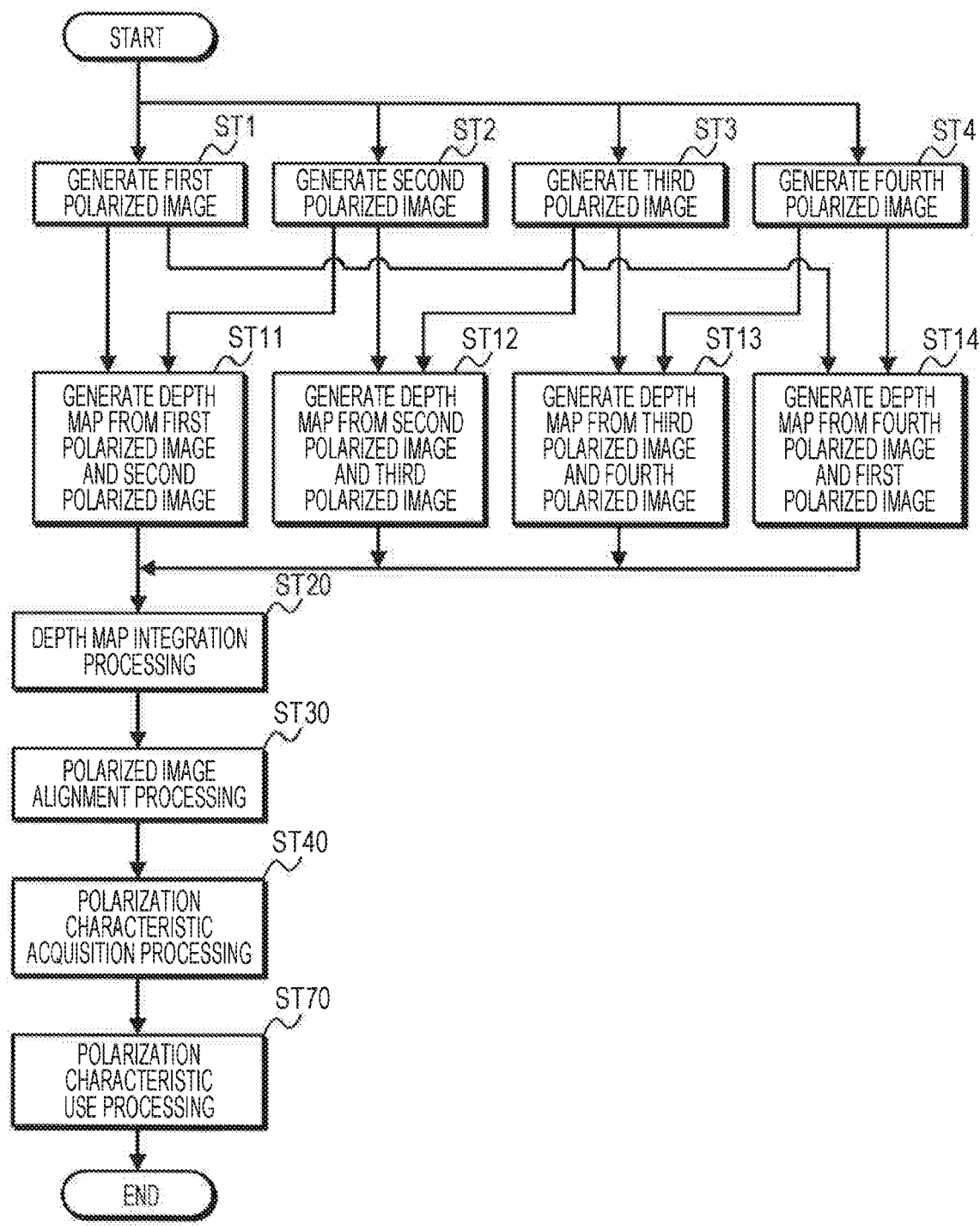
FIG. 22 is a flowchart illustrating an operation of the fourth embodiment.
Figure 23:
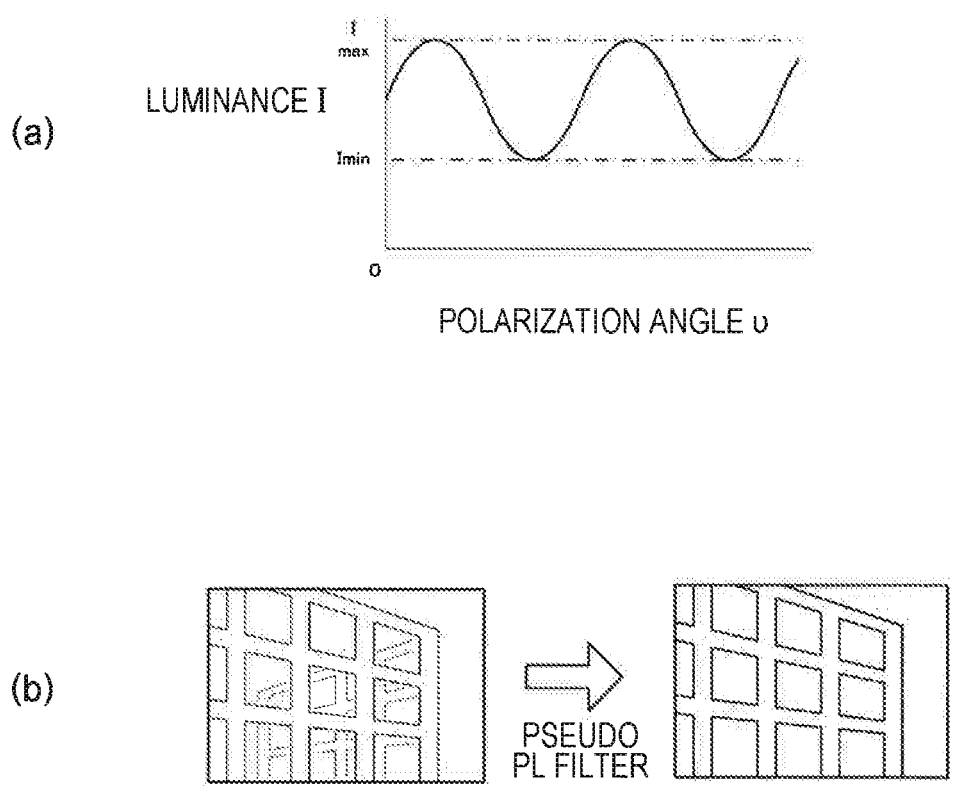
FIGS. 23(a) to 23(b) are each a diagram illustrating a first example of image processing using the polarization characteristic.
Figure 24:
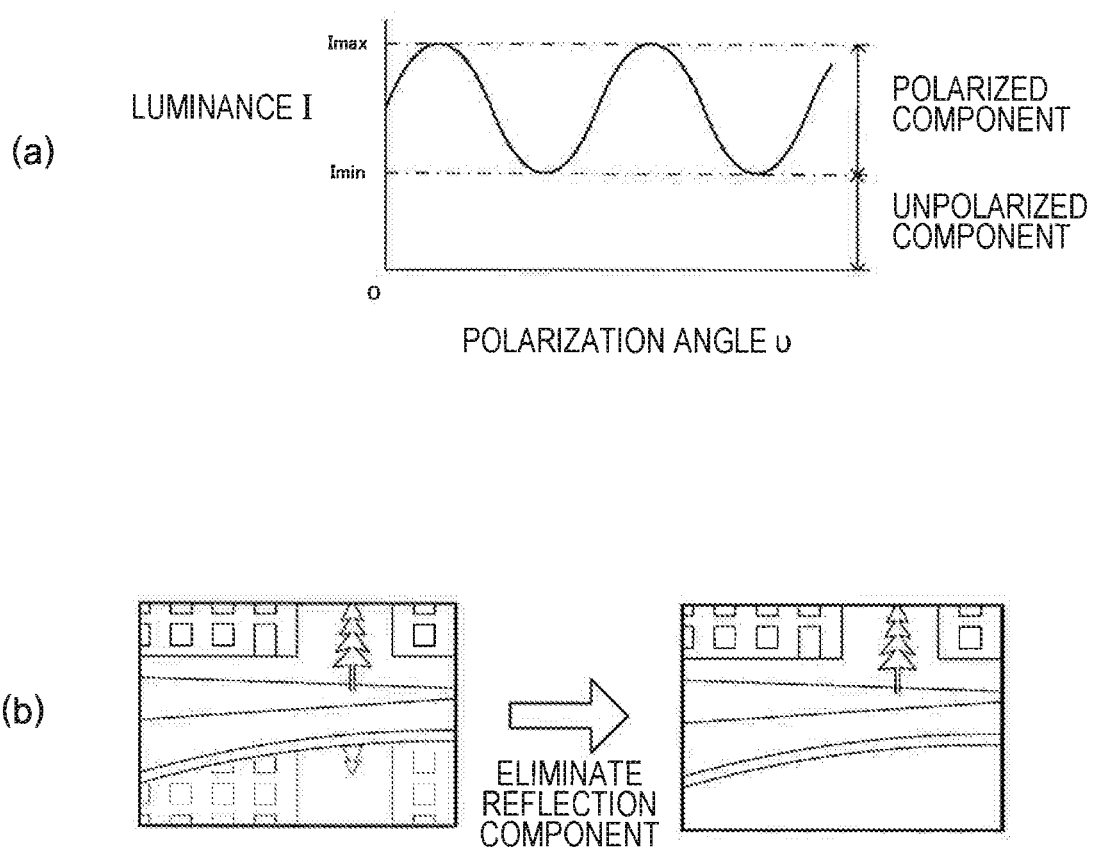
FIGS. 24(a) to 24(b) are each a diagram illustrating a second example of image processing using the polarization characteristic.

Next, an operation of the fourth embodiment will be described. FIG. 22 is a flowchart illustrating the operation of the fourth embodiment. In a similar manner to the first embodiment, in step ST1 to step ST4, the image pickup unit 21 generates the polarized images. For example, in step ST1, the image pickup section 211-1 of the image pickup unit 21 generates a first polarized image. In step ST2, the image pickup section 211-2 generates a second polarized image. In step ST3, the image pickup section 211-3 generates a third polarized image. In step ST4, the image pickup section 211-4 generates a fourth polarized image. Thus, in the image processing apparatus 10, the image pickup sections 211-1 to 211-4 generate the polarized images in different polarization directions at different viewpoint positions, and then the image processing apparatus 10 proceeds to step ST11 to step ST14, respectively.

In step ST11 to step ST14, the depth map generation unit 22 generates the depth maps. The depth map generation unit 22 generates the depth map from two polarized images at different viewpoint positions, and then proceeds to step ST20. Note that pairs of polarized images are not limited to a combination illustrated in FIG. 22.

In step ST20, the depth map generation unit 22 performs depth map integration processing. The depth map generation unit 22 integrates the depth maps generated in step ST11 to step ST14, and then proceeds to step ST30.

In step ST30, the alignment unit 23 performs polarized image alignment processing. The alignment unit 23 aligns the polarized images by using the depth map after integration, and then proceeds to step ST40.

In step ST40, the polarization characteristic acquisition unit 24 performs polarization characteristic acquisition processing. The polarization characteristic acquisition unit 24 calculates the polarization model equation for the desired viewpoint position by using the polarized images after alignment, and then proceeds to step ST70.

In step ST70, the polarization characteristic use unit 27 performs polarization characteristic use processing. The polarization characteristic use unit 27 uses the acquired polarization characteristic, for example, to perform image modification processing. FIGS. 23(a) to 23(b), FIGS. 24(a) to 24(b), and FIGS. 25(a) to 25(b) each illustrate a case of adjusting the reflection component of the image as modification processing using the polarization characteristic. (a) of FIG. 23, (a) of FIG. 24, and (a) of FIG. 25 each illustrate a relationship between an azimuth angle and luminance on the basis of the polarization model equation calculated in step ST40. Here, a range up to the lowest luminance Imin is a component in which luminance does not vary regardless of a polarization state, whereas a luminance range from the lowest luminance Imin to the highest luminance Imax is a range in which luminance varies depending on the polarization state. Therefore, controlling luminance according to the azimuth angle makes it possible to obtain a filter effect corresponding to a PL filter in a pseudo manner, and as illustrated in (b) of FIG. 23, a polarized image through a polarizing filter in a desired polarization direction can be generated from a normal picked up image.

In addition, the range up to the lowest luminance Imin is a component in which luminance does not vary regardless of the polarization state and corresponds to an unpolarized component, whereas the luminance range from the lowest luminance Imin to the highest luminance Imax is a range in which luminance varies depending on the polarization state, and corresponds to a polarized component. Accordingly, as illustrated in (b) of FIG. 24, by eliminating a luminance component corresponding to the polarized component from the normal picked up image, a picked up image from which the reflection component is eliminated can be generated.

Furthermore, the range up to the lowest luminance Imin is a component in which luminance does not vary regardless of the polarization state and corresponds to the unpolarized component, and this range can be mostly regarded as a diffused reflection component. In addition, the luminance range from the lowest luminance Imin to the highest luminance Imax can be mostly regarded as a specular reflection component. Therefore, as illustrated in (b) of FIG. 25, by suppressing the specular reflection component, it is possible to generate a picked up image in which glossiness is suppressed. Alternatively, by emphasizing the specular reflection component, it is possible to generate a picked up image with enhanced glossiness.

In addition, the polarization characteristic use unit 27 may calculate the image characteristic amount by using the polarization characteristic calculated by the polarization characteristic acquisition unit, and may perform processing in consideration of the surface shape of the subject by using the image characteristic amount, such as matching processing of three-dimensional subjects and recognition processing of the three-dimensional subject, for example. Next, as processing in consideration of the surface shape of the subject, an operation of performing matching processing of the three-dimensional subject will be described.

The polarization characteristic use unit 27 uses the polarization characteristic, for example, to calculate the image characteristic amount according to the surface shape of the subject in the polarized image at each pixel. FIGS. 26(a) to 26(c) are each a diagram for describing calculation of the image characteristic amount. (a) and (b) of FIG. 26 each illustrate a relationship between an angle of the polarization direction and luminance in a characteristic amount calculation object pixel of the image characteristic amount in the polarized image (hereinafter simply referred to as "object pixel"). (b) Of FIG. 26 illustrates a case where, for example, illumination light is brighter than (a) of FIG. 26. Note that FIGS. 26(a) to 26(c) each illustrate a case where the polarization angle is 0 degrees, 45 degrees, 90 degrees, and 135 degrees. In addition, luminance when the polarization angle at the object pixel is 0 degrees is $I_{0°}$ and $I'_{0°}$, luminance when the polarization angle is 45 degrees is $I_{45°}$ and $I'_{45°}$, luminance when the polarization angle is 90 degrees is $I_{90°}$ and $I'_{90°}$, and luminance when the polarization angle is 135 degrees is $I_{135°}$ and $I'_{135°}$. Thus, luminance of the polarized image varies depending on illumination or the like. Therefore, the polarization characteristic use unit 27 normalizes luminance so as to make it possible to determine whether the polarization characteristic has an identical characteristic even when luminance is different. The polarization characteristic use unit 27 calculates an average of luminance at each polarization angle, divides the luminance at each polarization angle by the calculated average luminance, and calculates normalized luminance. Note that (c) of FIG. 26 illustrates luminance after normalization, and a normalization reference level corresponds to average luminance.

The polarization characteristic use unit 27 sets the luminance of each polarization angle after normalization as the image characteristic amount. Note that Equation (18) illustrates the image characteristic amount when the polarized images with the polarization angle of 0 degrees, 45 degrees, 90 degrees, and 135 degrees are acquired.

[Mathematical Formula 11]

$$\frac{[I^\circ_0, I^\circ_{45}, I^\circ_{90}, I^\circ_{135}]}{\text{mean}(I^\circ_0, I^\circ_{45}, I^\circ_{90}, I^\circ_{135})} \quad (18)$$

Figure 27:
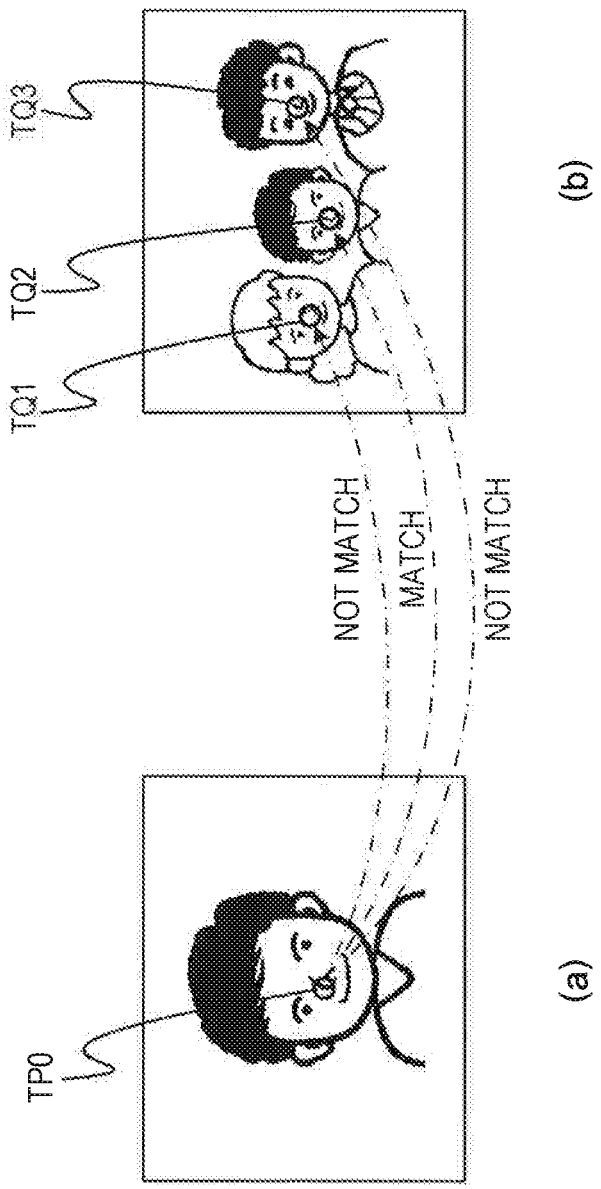
FIGS. 27(a) to 27(b) are each a diagram illustrating an operation in a case of performing matching processing.

The image characteristic amount calculated in this manner is information indicating the surface shape at the subject position corresponding to the object pixel. In addition, the polarization characteristic use unit 27 uses the calculated image characteristic amount to perform matching processing of the three-dimensional subject. FIGS. 27(a) to 27(b) each illustrate an operation when the polarization characteristic use unit performs matching processing.

The polarization characteristic use unit 27 determines which characteristic point detected in one image a characteristic point for matching detected in the other image (hereinafter referred to as "object characteristic point") matches by using the image characteristic amount. The characteristic point is detected, for example, on the basis of the image characteristic amount calculated on the basis of luminance at the polarization angle υ of 0 degrees, 45 degrees, 90 degrees, and 135 degrees. Here, the image characteristic amount of an object characteristic point TP0 is $[F^O_{0°}, F^O_{45°}, F^O_{90°}, F^O_{135°}]$. In addition, the image characteristic amount of another characteristic point TQj is $[F^j_{0°}, F^j_{45°}, F^j_{90°}, F^j_{135°}]$. Note that "j" is a variable denoting j-th characteristic point in another characteristic point.

The polarization characteristic use unit 27 determines a point at which a distance between vectors of the image characteristic amount is smallest as a matching point. For example, by performing calculation of Equation (19), the polarization characteristic use unit 27 distinguishes the characteristic point j at which the sum of squared difference of the object characteristic point from the image characteristic amount becomes minimum from the other characteristic point, and sets this as a matching point.

[Mathematical Formula 12]

$$j = \arg_j \min \sum_{0°,45°,90°,135°}^{d} abs\left(F^0_d - F^j_d\right)^2 \quad (19)$$

As described above, according to the fourth embodiment, it is possible to easily perform processing such as various types of modification processing and processing in consideration of the surface shape of the subject, by using the calculated polarization characteristic. In addition, in a similar manner to the first embodiment, it is possible to acquire the polarization characteristic at the desired viewpoint position for each pixel with high precision without causing reduction in temporal resolution and spatial resolution.

5. ANOTHER EMBODIMENT

Next, another embodiment will be described. Another embodiment illustrates a case of generating a normal map without generating a depth map.

Figure 28:
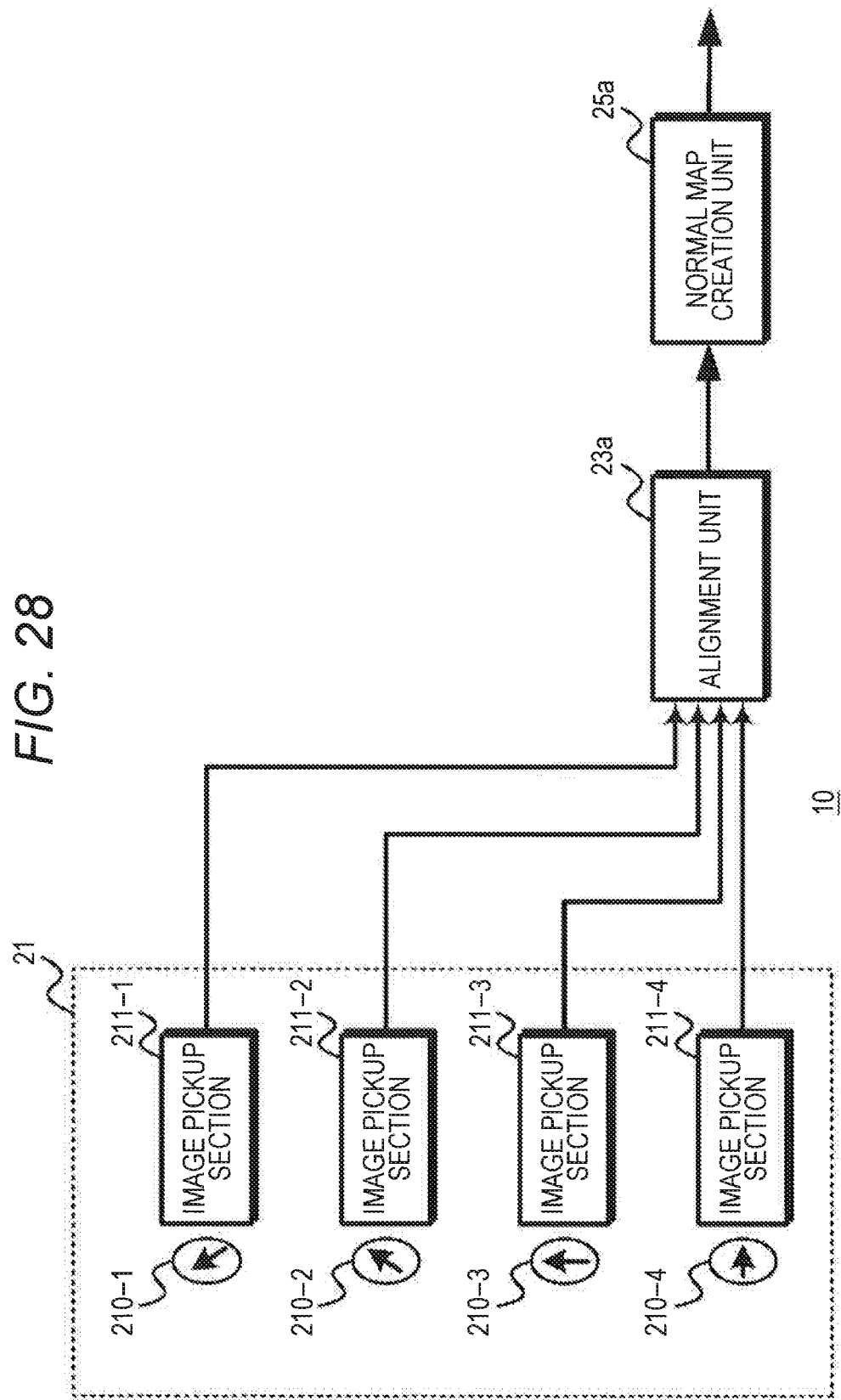
FIG. 28 is a diagram illustrating a functional configuration of another embodiment.

FIG. 28 is a diagram illustrating a functional configuration of another embodiment. An image processing apparatus 10 includes an image pickup unit 21, an alignment unit 23a, and a normal map generation unit 25a.

The image pickup unit 21 picks up a subject at a plurality of viewpoint positions through polarizing filters in different polarization directions at different viewpoint positions and generates polarized images. The image pickup unit 21 includes a plurality of image pickup sections, for example, four image pickup sections 211-1 to 211-4 so as to generate polarized images in three or more different polarization directions. A polarizing plate 210-1 is provided in front of the image pickup section 211-1. Similarly, polarizing plates 210-2 to 210-4 are provided in front of the image pickup sections 211-2 to 211-4, respectively. The polarizing plates 210-1 to 210-4 are provided in polarization directions different from one another. The image pickup sections 211-1 to 211-4 generate polarized images in the polarization directions different from one another. The image pickup unit 21 outputs image data of the polarized images generated by the image pickup sections 211-1 to 211-4 to a depth map generation unit 22 and the alignment unit 23a.

The image pickup unit 21 uses, for example, linear polarizing plates as the polarizing plates. In addition, the image pickup unit 21 may use not only the linear polarizing plates but also the linear polarizing plates and circular polarizing plates made of quarter wavelength edition. Furthermore, the image pickup unit 21 may be provided with depolarizing plates between the linear polarizing plates and the image pickup sections. Note that the image pickup unit 21 may generate polarized images in three or more different polarization directions with another configuration in a similar manner to the above-described first embodiment.

Figure 29:
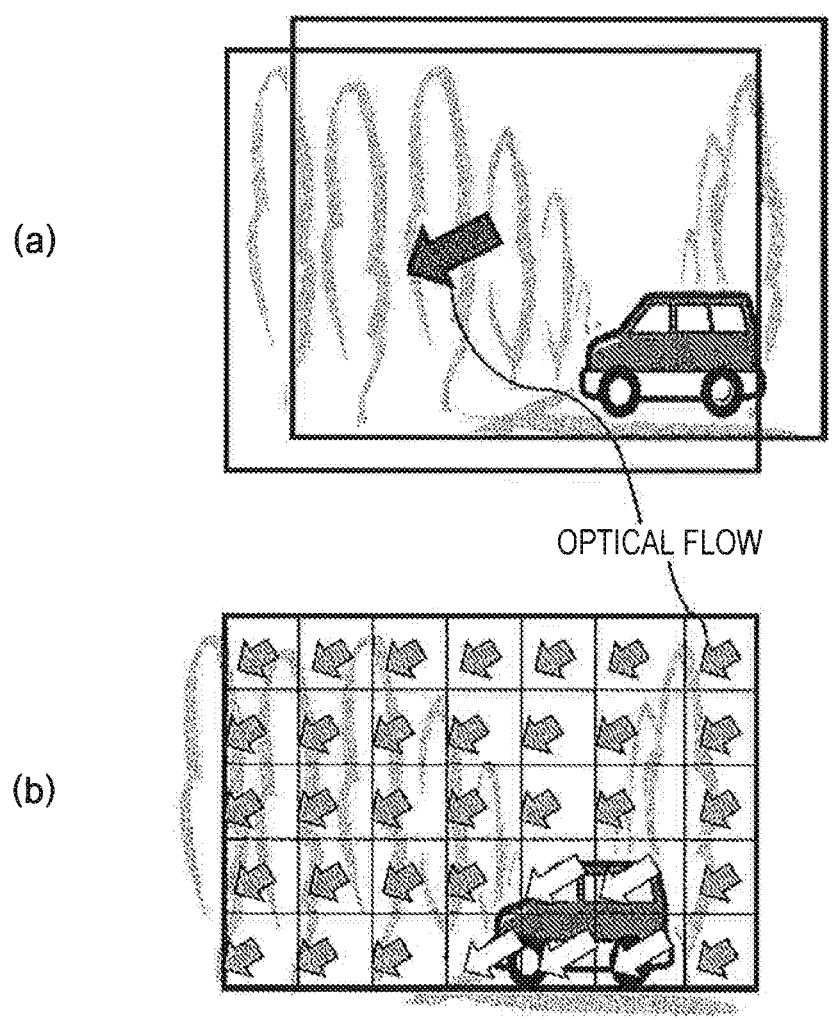
FIGS. 29(a) to 29(b) are each a diagram illustrating a case of detecting an optical flow.

The alignment unit 23a aligns the polarized images generated by the image pickup unit 21. The alignment unit 23a uses the image characteristic to align the polarized images without using the depth map. The alignment unit 23a approximately models movement between images or the like by homography, for example, on an entire screen, and aligns the polarized images on the basis of this model. In addition, for example, when a stationary subject is picked up from different viewpoint positions, images will be obtained in which the subject will move between the picked up images. Accordingly, the alignment unit 23a may detect an optical flow or the like and align the polarized images on the basis of a detection result. For example, as illustrated in FIGS. 29 (a) to 29 (b), in a case where a close subject (for example, a car) and a faraway subject (for example, trees) are mixed on an identical screen, when an optical flow is detected on an entire screen as illustrated in (a) of FIG. 29, it is difficult to detect the optical flow with high precision. Therefore, when the screen is divided into a plurality of blocks and the optical flow is detected in each block as illustrated in (b) of FIG. 29, the optical flow can be detected with high precision for each of the close subject and the faraway subject. Therefore, when the optical flow detected in each block is used, it is possible to align the polarized images with high precision.

On the basis of the polarized image in three or more polarization directions after alignment, the normal map generation unit 25a obtains a relationship between luminance and the polarization angle from the polarization direction and the luminance of the polarized image to determine an azimuth angle α at which luminance becomes highest. In addition, the normal map generation unit 25a calculates a polarization degree ρ by using the highest luminance and the lowest luminance obtained from the relationship between the luminance and the polarization angle, and determines the zenith angle θ corresponding to the calculated polarization degree ρ on the basis of a characteristic curve indicating a relationship between the polarization degree and the zenith angle. Thus, on the basis of the polarized image in three or more polarization directions after alignment, the normal map generation unit 25a obtains the normal information on the subject (azimuth angle α and zenith angle θ) at each pixel position to generate the normal map.

In such another embodiment, since it is not necessary to generate the depth map, the normal map can be easily generated. Note that since the depth map is not generated, the generated normal map has uncertainty of 180 degrees.

6. APPLICATIONS

Figure 30:
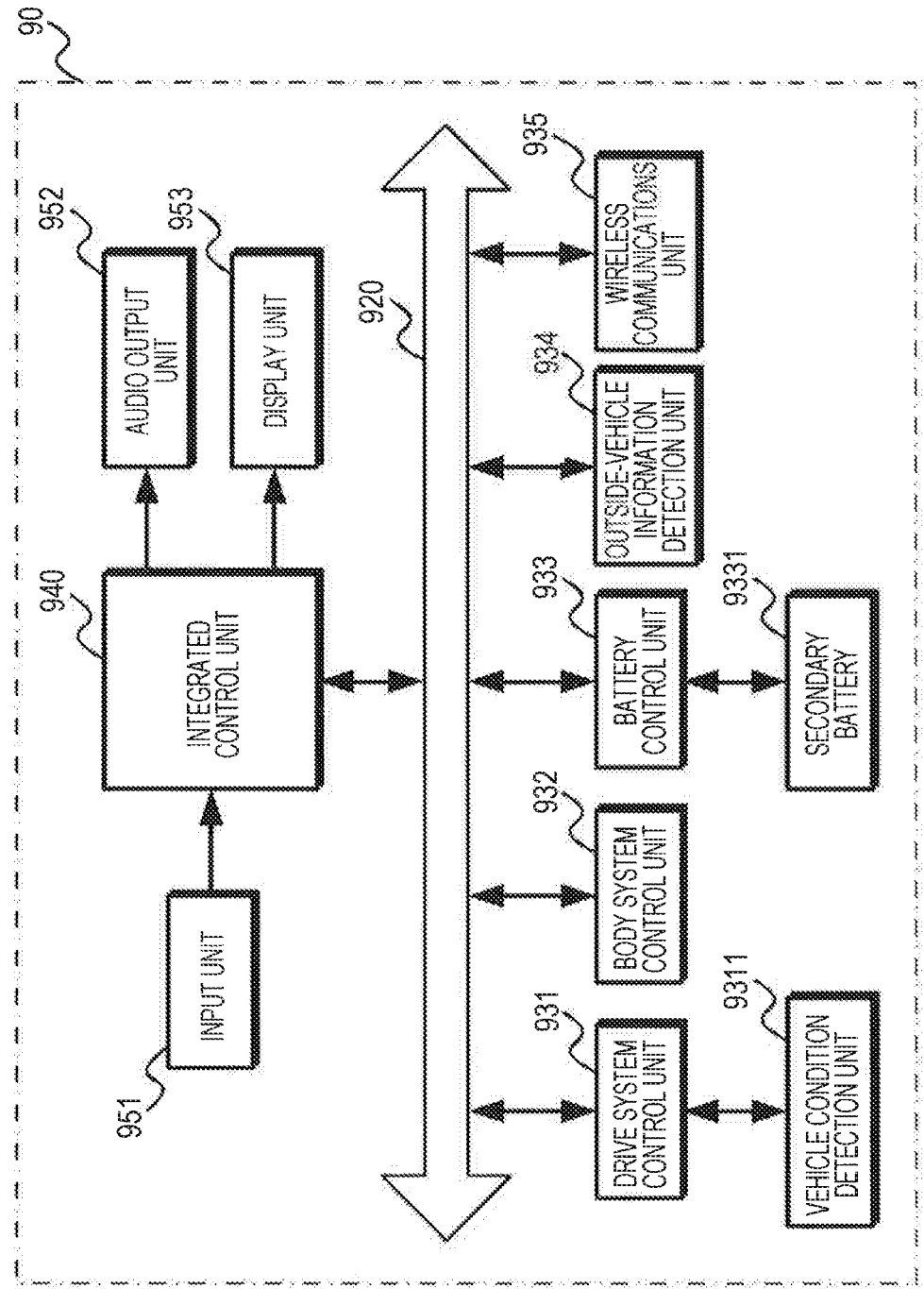
FIG. 30 is a block diagram illustrating a schematic configuration of a vehicle control system.

Next, applications of the image processing apparatus (image processing method) will be described. FIG. 30 is a block diagram illustrating a schematic configuration of a vehicle control system using the image processing apparatus of this technology. A vehicle control system 90 includes a plurality of control units and detection units connected via a communication network 920. In the example illustrated in FIG. 30, the vehicle control system 90 includes a drive system control unit 931, a body system control unit 932, a battery control unit 933, an outside-vehicle information detection unit 934, a wireless communication unit 935, and an integrated control unit 940. The communication network 920 may be, for example, a vehicle-mounted communication network that complies with arbitrary standards, such as a controller area network (CAN), a local interconnect network (LIN), a local area network (LAN), and FlexRay (registered trademark). In addition, an input unit 951, an audio output unit 952, and a display unit 953 are connected to the integrated control unit 940.

Each control unit includes a microcomputer that performs arithmetic processing according to various programs, a storage unit that stores the programs to be executed by the microcomputer or parameters to be used for various calculations or the like, and a drive circuit that drives various apparatuses to be controlled.

The drive system control unit 931 controls operations of apparatuses related to a vehicle drive system according to various programs. For example, the drive system control unit 931 functions as a driving force generation device for generating driving force of the vehicle, such as an internal combustion engine or a drive motor, a driving force transfer mechanism for transferring the driving force to wheels, and a steering mechanism for adjusting a rudder angle of the vehicle. In addition, the drive system control unit 931 may have a function as a control device such as a braking device for generating braking force of the vehicle, and a function as a control device such as an antilock brake system (ABS) and an electronic stability control (ESC).

A vehicle condition detection unit 9311 is connected to the drive system control unit 931. The vehicle condition detection unit 9311 includes, for example, at least one of a gyro sensor that detects angular velocity of axial rotational movement of a vehicle body, an acceleration sensor that detects acceleration of the vehicle, or a sensor for detecting an amount of operation of an accelerator pedal, an amount of operation of a brake pedal, a steering angle of a steering wheel, an engine speed, or a driving speed. The drive system control unit 931 performs arithmetic processing using a signal that is input from the vehicle condition detection unit 9311, and controls the internal combustion engine, the drive motor, an electric power steering device, a braking device, or the like.

The body system control unit 932 controls operations of various devices installed in the vehicle body according to various programs. For example, the body system control unit 932 functions as a keyless entry system, a smart key system, a power window device, or a control device of various lamps, such as a head lamp, a rear lamp, a brake lamp, a blinker, or a fog lamp. In this case, an electromagnetic wave that is sent from a portable device that substitutes for a key or signals of various switches can be input into the body system control unit 932. The body system control unit 932 receives input of the electromagnetic wave or signals, and controls devices of the vehicle, such as a door lock device, the power window device, and the lamps.

The battery control unit 933 controls a secondary battery 9331, which is an electric power supply source for the drive motor, according to various programs. For example, information such as battery temperature, battery output voltage, or battery remaining capacity is input into the battery control unit 933 from a battery device including the secondary battery 9331. The battery control unit 933 performs arithmetic processing by using these signals, and performs temperature adjustment control of the secondary battery 9331 or control of a cooling device or the like included in the battery device.

The outside-vehicle information detection unit 934 detects information on outside of the vehicle equipped with the vehicle control system 90. The image processing apparatus 10 of this technology is used for the outside-vehicle information detection unit 934.

Figure 31:
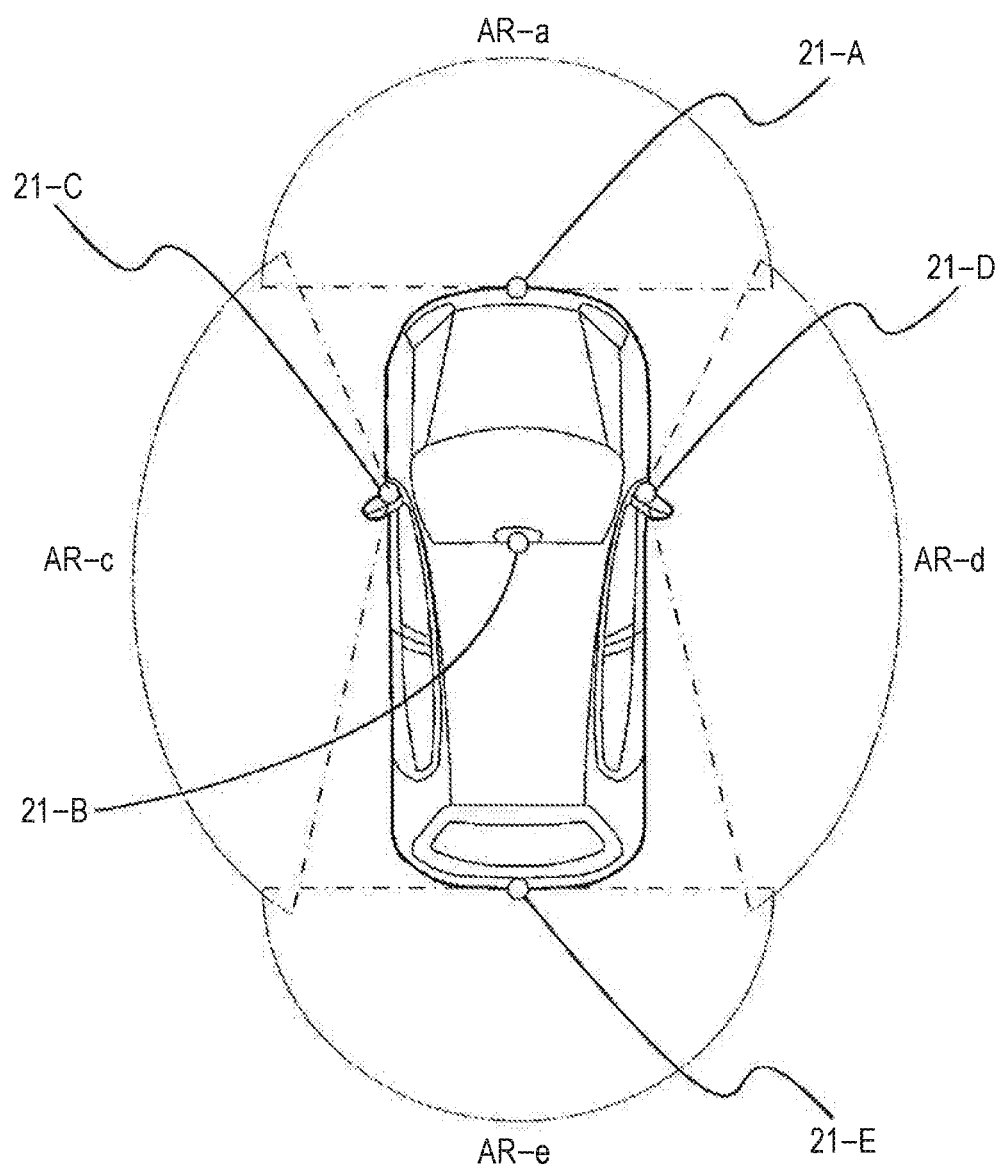
FIG. 31 is a diagram illustrating an example of installation of the image pickup unit.

FIG. 31 is a diagram illustrating an example of installation of the image pickup unit. The image pickup unit 21 of the image processing apparatus 10 is provided in, for example, at least one position of a front nose, sideview mirrors, rear bumper, back door, and upper portion of a windshield within an occupant compartment of a vehicle 80. The image pickup unit 21-A provided in the front nose and the image pickup unit 21-B provided in the upper portion of the windshield within the occupant compartment mainly acquire images ahead of the vehicle 80. The image pickup units 21-C and 21-D provided in the sideview mirrors mainly acquire images of the side of the vehicle 80. The image pickup unit 21-E provided in the rear bumper or back door mainly acquires images behind the vehicle 80. Note that FIGS. 26(a) to 26(c) each illustrate one example of a shooting range of each of the image pickup units 21-A to 21-E. The image pickup range AR-a indicates an image pickup range of the image pickup unit 21-A provided in the front nose. The image pickup ranges AR-c and AR-d indicate the image pickup ranges of the image pickup units 21-C and 21-D provided in the sideview mirrors, respectively. The image pickup range AR-e indicates an image pickup range of the image pickup unit 21-E provided in the rear bumper or back door.

Returning to FIG. 30, the outside-vehicle information detection unit 934 picks up surrounding regions of the vehicle and acquires polarized images. In addition, the outside-vehicle information detection unit 934 acquires a polarization characteristic of the subject from the acquired polarized images. Furthermore, the outside-vehicle information detection unit 934 performs processing such as generation of information available for vehicle control and the like by using the acquired polarization characteristic.

The wireless communication unit 935 communicates with outside of the vehicle, for example, other vehicles and a management center that manages road conditions and the like via a wireless communication network such as dedicated short range communication (DSRC) (registered trademark). The wireless communication unit 935 then outputs received information to the integrated control unit 940. In addition, the wireless communication unit 935 transmits information such as the polarization characteristic acquired by the outside-vehicle information detection unit 934 to other vehicles, the management center, and the like. Note that the wireless communication unit 935 may communicate with the management center via a wireless communication network such as a wireless communication network of wireless LAN, a wireless communication network for mobile phones such as 3G, LTE, and 4G. In addition, the wireless communication unit 935 may receive a signal of the global navigation satellite system (GNSS) or other signals and perform positioning, and output a positioning result to the integrated control unit 940.

The input unit 951, the audio output unit 952, and the display unit 953 are connected to the integrated control unit 940. The input unit 951 is implemented, for example, by a device on which an occupant can perform input operations, such as a touch panel, a button, a microphone, a switch, or a lever. The input unit 951 generates an input signal on the basis of information input by the occupant or the like, and outputs the input signal to the integrated control unit 940.

The audio output unit 952 aurally notifies the vehicle occupant of information by outputting audio based on an audio signal from the integrated control unit 940. The display unit 953 displays images on the basis of an image signal from the integrated control unit 940 and visually notifies the vehicle occupant of information.

The integrated control unit 940 has a central processing unit (CPU), a read only memory (ROM), a random access memory (RAM), and the like. The read only memory (ROM) stores various programs to be executed by the central processing unit (CPU). The random access memory (RAM) stores various parameters and information such as an arithmetic result or sensor values. The CPU executes the various programs stored in the ROM, and controls overall operations in the vehicle control system 90 in accordance with the input signal from the input unit 951, information acquired through communication with each control unit via the communication network 920, the outside-vehicle information detection unit, and the wireless communication unit, and the information stored in the RAM. In addition, the integrated control unit 940 generates the audio signal indicating information to be aurally notified to the vehicle occupant and outputs the audio signal to the audio output unit 952, and generates the image signal visually notifying information and outputs the image signal to the display unit 953. In addition, the integrated control unit 940 communicates with various devices that exist outside the vehicle, such as other vehicles and the management center, by using the wireless communication unit 935. In addition, the integrated control unit 940 performs vehicle driving support on the basis of map information stored in the ROM or RAM and the positioning result acquired from the wireless communication unit 935.

Note that in the example illustrated in FIG. 30, at least two control units connected via the communication network 920 may be integrated as one control unit. Alternatively, each individual control unit may include a plurality of control units. Furthermore, the vehicle control system 90 may include another unillustrated control unit. In addition, in the above description, some or all of functions to be performed by any one of the control units may be performed by another control unit. In other words, as long as information is transmitted and received via the communication network 920, predetermined arithmetic processing may be performed by anyone of the control units.

In such a vehicle control system, when the image processing apparatus of the present technology is applied, for example, to the outside-vehicle information detection unit, the outside-vehicle information detection unit can perform subject recognition and the like with high precision, and generate the depth map with high spatial resolution and high precision. In addition, by performing various types of modification processing such as, for example, filter processing corresponding to the PL filter, elimination of reflection components, and adjustment of glossiness, it is possible to generate picked up images with suppressed reflection and glare. This makes it possible to detect an obstacle, to grasp a distance to the obstacle, and the like with high precision by using information such as the depth map generated by the outside-vehicle information detection unit and images after the modification processing, and to construct a vehicle control system that enables safer driving.

In addition, the above-described image processing apparatus may be an electronic device or the like including an image pickup device or an image pickup function. Furthermore, a series of processes described in the specification can be executed by hardware, software, or a combined configuration of both hardware and software. In a case of executing processing by software, a program recording processing sequence is installed in a memory within a computer incorporated in dedicated hardware for execution. Alternatively, it is possible to install and execute a program for executing the above processing in a general-purpose computer capable of executing various processes.

For example, the program can be recorded in advance in a hard disk, a solid state drive (SSD), or a read only memory (ROM) as a recording medium. Alternatively, the program can be stored (recorded) temporarily or permanently on a removable recording medium such as a flexible disk, a compact disc read only memory (CD-ROM), a magneto optical (MO) disk, a digital versatile disc (DVD), a Blu-ray Disc (BD) (registered trademark), a magnetic disk, and a semiconductor memory card. Such a removable recording medium can be provided as so-called package software.

Also, in addition to installing the program from the removable recording medium into a computer, the program may be transferred wirelessly or by wire from a download site to a computer via a network such as a local area network (LAN) and the Internet. The computer can receive the program transferred in this way and install the program on a recording medium such as a built-in hard disk.

It is to be noted that effects described in the present specification are merely illustrative and not restrictive, and there may be additional effects that are not described. In addition, the present technology should not be construed as limited to the above-described embodiments, and for example, the above embodiments may be combined. The embodiments of this technology disclose the present technology in a form of illustration, and it is obvious that those skilled in the art can make modifications and substitutions of the embodiments without departing from the spirit of the present technology. That is, in order to determine the spirit of the present technology, the claims should be taken into consideration.

In addition, the image processing apparatus of the present technology can also have the following configurations.

(1) An image processing apparatus including:

an alignment unit configured to align polarized images obtained by picking up a subject at a plurality of viewpoint positions through polarizing filters in different polarization directions at the different viewpoint positions on the basis of a depth map indicating distance information on the subject; and a polarization characteristic acquisition unit configured to acquire a polarization characteristic of the subject from a desired viewpoint position by using the polarized images aligned by the alignment unit.

(2) The image processing apparatus according to (1), further including a depth map generation unit configured to generate the depth map from images obtained by picking up the subject at the plurality of viewpoint positions.

(3) The image processing apparatus according to (2), wherein the depth map generation unit generates the depth map for each image combination in the images at the plurality of viewpoint positions and integrates the generated depth map, and the alignment unit aligns the polarized images on the basis of the depth map after integration obtained by the depth map generation unit.

(4) The image processing apparatus according to (2) or (3), wherein as the images obtained by picking up the subject at the plurality of viewpoint positions, the depth map generation unit uses the polarized images.

(5) The image processing apparatus according to (2) or (3), wherein as the images obtained by picking up the subject at the plurality of viewpoint positions, the depth map generation unit uses images picked up without through the polarizing filters or through polarizing filters in an identical polarization direction.

(6) The image processing apparatus according to any of (1) to (5), wherein the polarization characteristic acquisition unit acquires the polarization characteristic of the subject from the desired viewpoint position on the basis of polarization directions and luminance of the plurality of aligned polarized images.

(7) The image processing apparatus according to any of (1) to (6), further including a normal map generation unit configured to generate a normal map of the subject at the desired viewpoint position on the basis of the polarization characteristic calculated by the polarization characteristic acquisition unit.

(8) The image processing apparatus according to (7), wherein the normal map generation unit generates the normal map from which uncertainty of 180 degrees in polarization analysis is eliminated on the basis of the depth map used by the alignment unit.

(9) The image processing apparatus according to (7) or (8), further including a high-precision depth map generation unit configured to integrate the depth map used by the alignment unit and the normal map generated by the normal map generation unit to generate a depth map with higher precision than the depth map used by the alignment unit.

(10) The image processing apparatus according to any of (1) to (9), further including an image pickup unit configured to generate the polarized images by picking up the subject at the plurality of viewpoint positions through the polarizing filters in different polarization directions at the different viewpoint positions.

(11) The image processing apparatus according to (10), wherein in the image pickup unit, image pickup sections are provided at the plurality of viewpoint positions, and the image pickup sections are provided with the polarizing filters in different polarization directions to generate the polarized images at the plurality of viewpoint positions.

(12) The image processing apparatus according to (10), wherein in the image pickup unit, a plurality of lenses are arranged in a direction orthogonal to an optical axis direction on a light incident surface side of an imaging element, and the lenses are provided with the polarizing filters in different polarization directions to generate the polarized images at the plurality of viewpoint positions.

(13) The image processing apparatus according to (10), wherein the image pickup unit further includes image pickup sections configured to pick up the subject at the plurality of viewpoint positions without through the polarizing filters or through polarizing filters in an identical polarization direction to generate images.

(14) The image processing apparatus according to any of (1) to (12), further including a polarization characteristic use unit configured to perform image processing by using the polarization characteristic calculated by the polarization characteristic acquisition unit.

(15) The image processing apparatus according to (14), wherein the polarization characteristic use unit uses the polarization characteristic calculated by the polarization characteristic acquisition unit to generate an image with a reflection component of the image at the desired viewpoint position adjusted.

(16) The image processing apparatus according to (14) or (15), wherein the polarization characteristic use unit calculates an image characteristic amount by using the polarization characteristic calculated by the polarization characteristic acquisition unit, and uses the image characteristic amount to perform processing in consideration of a surface shape of the subject.

INDUSTRIAL APPLICABILITY

In the image processing apparatus and the image processing method of this technology, alignment is performed on the polarized images obtained by picking up the subject at the plurality of viewpoint positions through the polarizing filters in different polarization directions at different viewpoint positions on the basis of the depth map indicating distance information on the subject. Furthermore, by using the aligned polarized images, the polarization characteristic of the subject from the desired viewpoint position is acquired. Therefore, if the normal is calculated on the basis of this polarization characteristic, the surface shape of the subject can be detected from the desired position with high precision. In addition, by using the acquired polarization characteristic, it is possible to acquire the desired polarized images without picking up images at the desired viewpoint position while adjusting the polarization directions of the polarizing filters. Therefore, it is suitable for devices such as a device that acquires the three-dimensional shape of the subject and a device that performs modification processing or the like on the picked up images.

REFERENCE SIGNS LIST

10 Image processing apparatus
21, 21a, 21-A to 21-E Image pickup unit
22, 22a Depth map generation unit
23, 23a Alignment unit
24 Polarization characteristic acquisition unit
25, 25a Normal map generation unit
26 High-precision depth map generation unit
27 Modification processing unit
90 Vehicle control system
210-1 to 210-4, 210-$n$, 210-$p$, 223 Polarizing plate
211-1 to 211-6, 211-$n$, 211-$p$, 211-$p$ Image pickup section
221 Image sensor
222 Lens

The invention claimed is:

1. An image processing apparatus comprising:
a depth map generation unit configured to generate an integrated depth map indicating distance information on a subject from a plurality of polarized images obtained by picking up the subject at a plurality of different viewpoint positions;
an alignment unit configured to align the plurality of polarized images obtained by picking up the subject at the plurality of different viewpoint positions through polarizing filters in at least four different polarization directions at the plurality of different viewpoint positions on the basis of the generated depth map indicating the distance information on the subject;
a polarization characteristic acquisition unit configured to acquire a polarization characteristic of the subject from a desired viewpoint position by using the plurality of polarized images aligned by the alignment unit; and
a normal map generation unit configured to generate a normal map of the subject at the desired viewpoint position on the basis of the polarization characteristic acquired by the polarization characteristic acquisition unit,
wherein the depth map generation unit generates a plurality of depth maps including a respective depth map for each respective pair of a plurality of pairs of polarized images among the plurality of polarized images obtained by picking up the subject at the plurality of different viewpoint positions through the polarizing filters in the at least four different polarization directions and generates the integrated depth map by integrating the plurality of depth maps generated for the plurality of pairs of polarized images,
wherein each respective depth map is generated by performing stereo matching processing on the respective pair of polarized images prior to integrating the plurality of depth maps,
wherein the plurality of pairs of polarized images include pairs of each respective polarized image obtained using a polarizing filter in a respective polarization direction paired with only two other polarized images obtained using different polarization filters in different polarization directions among the at least four different polarization directions, and
wherein the depth map generation unit, the alignment unit, the polarization characteristic acquisition unit, and the normal map generation unit are each implemented via at least one processor.

2. The image processing apparatus according to claim 1, wherein the polarization characteristic acquisition unit acquires the polarization characteristic of the subject from the desired viewpoint position on the basis of polarization directions and luminance of the plurality of aligned polarized images.

3. The image processing apparatus according to claim 1, wherein the normal map generation unit generates the normal map from which uncertainty of 180 degrees in polarization analysis is eliminated on the basis of the depth map used by the alignment unit.

4. The image processing apparatus according to claim 1, further comprising a high-precision depth map generation unit configured to integrate the depth map used by the alignment unit and the normal map generated by the normal map generation unit to generate a depth map with higher precision than the depth map used by the alignment unit,
wherein the high-precision depth map generation unit is implemented via at least one processor.

5. The image processing apparatus according to claim 1, further comprising an image pickup unit configured to generate the plurality of polarized images by picking up the subject at the plurality of different viewpoint positions through the polarizing filters in different polarization directions at the different viewpoint positions.

6. The image processing apparatus according to claim 5, wherein in the image pickup unit, image pickup sections are provided at the different plurality of viewpoint positions, and
wherein the image pickup sections are provided with the polarizing filters in different polarization directions to generate the plurality of polarized images at the plurality of different viewpoint positions.

7. The image processing apparatus according to claim 5, wherein in the image pickup unit, a plurality of lenses are arranged in a direction orthogonal to an optical axis direction on a light incident surface side of an imaging element, and
wherein the lenses are provided with the polarizing filters in different polarization directions to generate the plurality of polarized images at the plurality of different viewpoint positions.

8. The image processing apparatus according to claim 5, wherein the image pickup unit further comprises image pickup sections configured to pick up the subject at the plurality of different viewpoint positions without through the polarizing filters or through polarizing filters in an identical polarization direction to generate images.

9. The image processing apparatus according to claim 1, further comprising a polarization characteristic use unit configured to perform image processing by using the polarization characteristic calculated by the polarization characteristic acquisition unit,
wherein the polarization characteristic use unit is implemented via at least one processor.

10. The image processing apparatus according to claim 9, wherein the polarization characteristic use unit uses the polarization characteristic calculated by the polarization characteristic acquisition unit to generate an image with a reflection component of the image at the desired viewpoint position adjusted.

11. The image processing apparatus according to claim 9, wherein the polarization characteristic use unit calculates an image characteristic amount by using the polarization characteristic calculated by the polarization characteristic acquisition unit, and uses the image characteristic amount to perform processing in consideration of a surface shape of the subject.

12. An image processing method, executed by at least one processor, the method comprising:
generating an integrated depth map indicating distance information on a subject from a plurality of polarized images obtained by picking up the subject at a plurality of different viewpoint positions;
aligning the plurality of polarized images obtained by picking up the subject at the plurality of different viewpoint positions through polarizing filters in at least four different polarization directions at the plurality of different viewpoint positions on the basis of the generated depth map indicating the distance information on the subject;
acquiring a polarization characteristic of the subject from a desired viewpoint position by using the plurality of aligned polarized images; and generating a normal map of the subject at the desired viewpoint position on the basis of the acquired polarization characteristic, wherein the integrated depth map is generated by generating a plurality of depth maps including a respective depth map for each respective pair of a plurality of pairs of polarized images among the plurality of polarized images obtained by picking up the subject at the plurality of different viewpoint positions through the polarizing filters in the at least four different polarization directions and integrating the plurality of depth maps generated for the plurality of pairs of polarized images, wherein each respective depth map is generated by performing stereo matching processing on the respective pair of polarized images prior to integrating the plurality of depth maps, and wherein the plurality of pairs of polarized images include pairs of each respective polarized image obtained using a polarizing filter in a respective polarization direction paired with only two other polarized images obtained using different polarization filters in different polarization directions among the at least four different polarization directions.

* * * * *